US011563495B2

(12) United States Patent
Bhaskara et al.

(10) Patent No.: US 11,563,495 B2
(45) Date of Patent: Jan. 24, 2023

(54) OPTICAL MODULES WITH VIRTUAL TRANSPORT FUNCTIONS

(71) Applicant: Infinera Corporation, Sunnyvale, CA (US)

(72) Inventors: Vasudha N. Bhaskara, Milpitas, CA (US); Steven Joseph Hand, Los Gatos, CA (US); Rajan Rao, Fremont, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/402,348

(22) Filed: Aug. 13, 2021

(65) Prior Publication Data

US 2022/0103258 A1 Mar. 31, 2022

Related U.S. Application Data

(60) Provisional application No. 63/085,268, filed on Sep. 30, 2020.

(51) Int. Cl.
*H04B 10/27* (2013.01)
*H04B 10/40* (2013.01)

(52) U.S. Cl.
CPC .......... *H04B 10/27* (2013.01); *H04B 10/40* (2013.01)

(58) Field of Classification Search
CPC ................................ H04B 10/27; H04B 10/40
USPC ........................................................ 398/135
See application file for complete search history.

(56) References Cited

U.S. PATENT DOCUMENTS

| | | | | |
|---|---|---|---|---|
| 9,800,345 | B1* | 10/2017 | Leigh | H04B 10/27 |
| 11,342,997 | B1* | 5/2022 | Haylock | H04J 14/02 |
| 2016/0088374 | A1* | 3/2016 | Coffey | G02B 6/3825 398/28 |
| 2016/0234099 | A1* | 8/2016 | Jiao | H04L 45/02 |
| 2018/0213305 | A1* | 7/2018 | Campos | H04J 14/0271 |
| 2019/0036828 | A1* | 1/2019 | Bajaj | H04L 47/2425 |
| 2022/0006523 | A1* | 1/2022 | Rao | H04B 10/272 |
| 2022/0224419 | A1* | 7/2022 | Jafari | G02B 6/29395 |

* cited by examiner

*Primary Examiner* — Dalzid E Singh
(74) *Attorney, Agent, or Firm* — David L. Soltz

(57) ABSTRACT

Systems, devices, and techniques relating to optical communications are described. A described hub optical module includes an optical transceiver configured to communicate with edge optical modules of respective edge devices via an optical communication network, the edge optical modules comprising edge interfaces; and a controller coupled with the optical transceiver. The controller can be configured to provide, to a hub device, hub interfaces which are configurable to respectively correspond to different optical subcarriers transmitted from and received by the optical transceiver. The controller can advertise, to the hub device, an application select code to enable the hub device to configure an operational mode and to selectively enable each of the hub interfaces in the operational mode, store one or more associations among the hub interfaces and the edge interfaces, and configure one or more cross-connections among the hub interfaces and the optical subcarriers based on the one or more associations.

20 Claims, 15 Drawing Sheets

OPTICAL MODULES WITH VIRTUAL TRANSPORT FUNCTIONS

CROSS REFERENCE TO RELATED APPLICATIONS

The present disclosure claims the benefit of the priority of U.S. Provisional Application Ser. No. 63/085,268, filed Sep. 30, 2020, and entitled "Virtualized Transponder," which is incorporated herein by reference in its entirety.

The present disclosure is related to PCT Application No. PCT/US2020/018292, filed on Feb. 14, 2020 and entitled "Out-of-band communication channel for sub-carrier-based optical communication systems" (WO2020180475A1), which is incorporated herein by reference in its entirety. The present disclosure is related to U.S. Patent Publication No. 2020/0403702, filed on Sep. 22, 2019 and entitled "Frequency division multiple access optical subcarriers," which is incorporated herein by reference in its entirety. The present disclosure is related to U.S. Patent Publication No. 2021/0126730, filed on Jun. 4, 2020 and entitled "Out-of-band communication channel for sub-carrier-based optical communication systems," which is incorporated herein by reference in its entirety. The present disclosure is related to U.S. Patent Publication No. 2021/0091873, filed on Jul. 30, 2020 and entitled "Optical communication system transmitting and receiving optical subcarriers having different spectral widths and/or power values," which is incorporated herein by reference in its entirety.

BACKGROUND

Optical communication networks can include a first node that outputs an optical carrier(s) to one or more second nodes. The first and second nodes can be connected to each other via transport devices and an optical line system. The nodes in an optical communication network can include, for example, an internet protocol (IP) router, as well as an optical module that plugs into the router and connects to other components within the optical communication network. The optical module includes a transceiver for transmitting and receiving data. An optical control channel (OCC) such as an optical supervisory channel (OSC) can be used to monitor and control optical modules. The optical modules and other node equipment, such as the router, can be provided by the same vendor or by different vendors.

In some optical communication networks, multiple optical signals, each having a corresponding wavelength, and each being modulated to carry a different data stream, are multiplexed onto an optical fiber. In such systems, a laser and a modulator can be provided to generate each optical signal. Additional lasers, modulators, and associated circuitry can be used to increase the capacity of such systems. In some networks, separate lasers/modulators are used at the first node to communicate with respective second nodes.

SUMMARY

The present disclosure includes systems and techniques for providing virtualized transport functionality. According to an aspect of the present disclosure, a hub optical module of a system for providing virtualized transport functionality includes an optical transceiver configured to communicate with edge optical modules of respective edge devices via an optical communication network, the edge optical modules respectively comprising edge interfaces; and a controller coupled with the optical transceiver. The hub optical module can be incorporated in a hub device. The controller of the hub optical module, which can be referred to as a hub controller, can be configured to provide, to a hub device, hub interfaces which are configurable to respectively correspond to different optical subcarriers transmitted from and received by the optical transceiver. The hub controller can advertise, to the hub device, an application select code to enable the hub device to configure an operational mode and to selectively enable each of the hub interfaces in the operational mode; store one or more associations among the hub interfaces and the edge interfaces; and configure one or more cross-connections among the hub interfaces and the optical subcarriers based on the one or more associations.

This and other implementations can include one or more of the following features. The one or more associations can include a hub-edge interface association. The hub controller can be configured to receive, via the optical transceiver, a request from an edge optical module of the plurality of edge optical modules; determine the hub-edge interface association based on the request; assign an optical subcarrier of the optical subcarriers to the edge optical module based on the hub-edge interface association; and transmit assignment information identifying the assigned optical subcarrier to the edge optical module.

In some implementations, the hub controller is configured to determine a carrier frequency associated with the request. The hub-edge interface association can be based on the carrier frequency. The assigned optical subcarrier can be within a channel associated with the carrier frequency. The hub controller can be configured to receive data from the hub device via a hub interface of the hub interfaces that is assigned to handle communications with the edge optical module, cause the optical transceiver to tune to the channel, and use the assigned optical subcarrier to transmit the data to the edge optical module.

In some implementations, the assignment information comprises a channel number and a hub interface identifier. The hub interface identifier can be associated with a hub interface of the hub interfaces that is assigned to handle communications with the edge optical module. The assigned optical subcarrier can be selected based on the channel number and the hub interface identifier.

In some implementations, the request includes a requested host interface medium access control (MAC) address. The hub interfaces can be associated with respective host interface MAC addresses. The hub controller can be configured to determine the hub-edge interface association based on the requested host interface MAC address. In some implementations, the hub controller is configured to receive from a configuration server configuration information that provides the hub-edge interface association for the edge optical module.

The hub optical module can include a memory configured to store optical subcarrier assignments associated with the edge optical modules. In some implementations, the assigned optical subcarrier is in accordance with the optical subcarrier assignments. In some implementations, the hub controller is configured to discover the edge optical modules using an optical control channel. In some implementations, the request is received over the optical control channel. In some implementations, the hub device comprises an optical module that includes the optical transceiver and the hub controller. In some implementations, the hub controller is configured to receive from a configuration server configuration information that provides the one or more associations. In some implementations, the configuration information includes optical subcarrier assignments for one or more of the edge optical modules.

According to another aspect of the present disclosure, an edge optical module of a system for providing virtualized transport functionality includes an optical transceiver configured to communicate with a hub optical module of a hub device via an optical communication network; and a controller, which can be referred to as an edge controller, coupled with the optical transceiver. The edge optical module can be incorporated in an edge device. The edge controller can be configured to provide, to an edge device, an edge interface; advertise, to the edge device, an application select code to enable the edge device to configure an operational mode and to enable the edge interface to transmit and receive data in the operational mode; store an association among the edge interface and a hub interface of the hub optical module; and configure a cross-connection among the edge interface and an optical subcarrier based on the association. The optical subcarrier can be determined based on the association.

This and other implementations can include one or more of the following features. The edge controller can be configured to transmit, via the optical transceiver, a request to the hub optical module to establish communications with the hub optical module, and receive assignment information from the hub optical module in response to the request. The optical subcarrier can be determined based on the assignment information. In some implementations, the assignment information includes a channel number and a hub interface identifier associated with the hub interface. In some implementations, the optical subcarrier is determined based on the channel number and the hub interface identifier.

In some implementations, the request is associated with a carrier frequency. The association can be based on the carrier frequency. The optical subcarrier can be within a channel associated with the carrier frequency. In some implementations, the edge controller is configured to cause the optical transceiver to tune to a frequency associated with the optical subcarrier.

In some implementations, the request includes a host interface MAC address, the host interface MAC address being associated with the hub interface. The assignment information can include a channel number and a hub interface identifier associated with the hub interface. The edge controller can determine the optical subcarrier based on the channel number and the hub interface identifier.

In some implementations, the edge controller is configured to receive configuration information regarding the association from a configuration server. In some implementations, the configuration information includes optical subcarrier assignment information, and the optical subcarrier is determined based on the optical subcarrier assignment information. In some implementations, the edge device includes an optical module that includes the optical transceiver and the edge controller. In some implementations, the edge controller is configured to discover the hub optical module using an optical control channel. The request can be transmitted over the optical control channel.

Details of one or more implementations are set forth in the accompanying drawings and the description below. Other features and advantages will be apparent from the description and drawings, and from the claims.

DRAWING DESCRIPTIONS

Like reference symbols in the various drawings indicate like elements.

DETAILED DESCRIPTION

Figure 1:
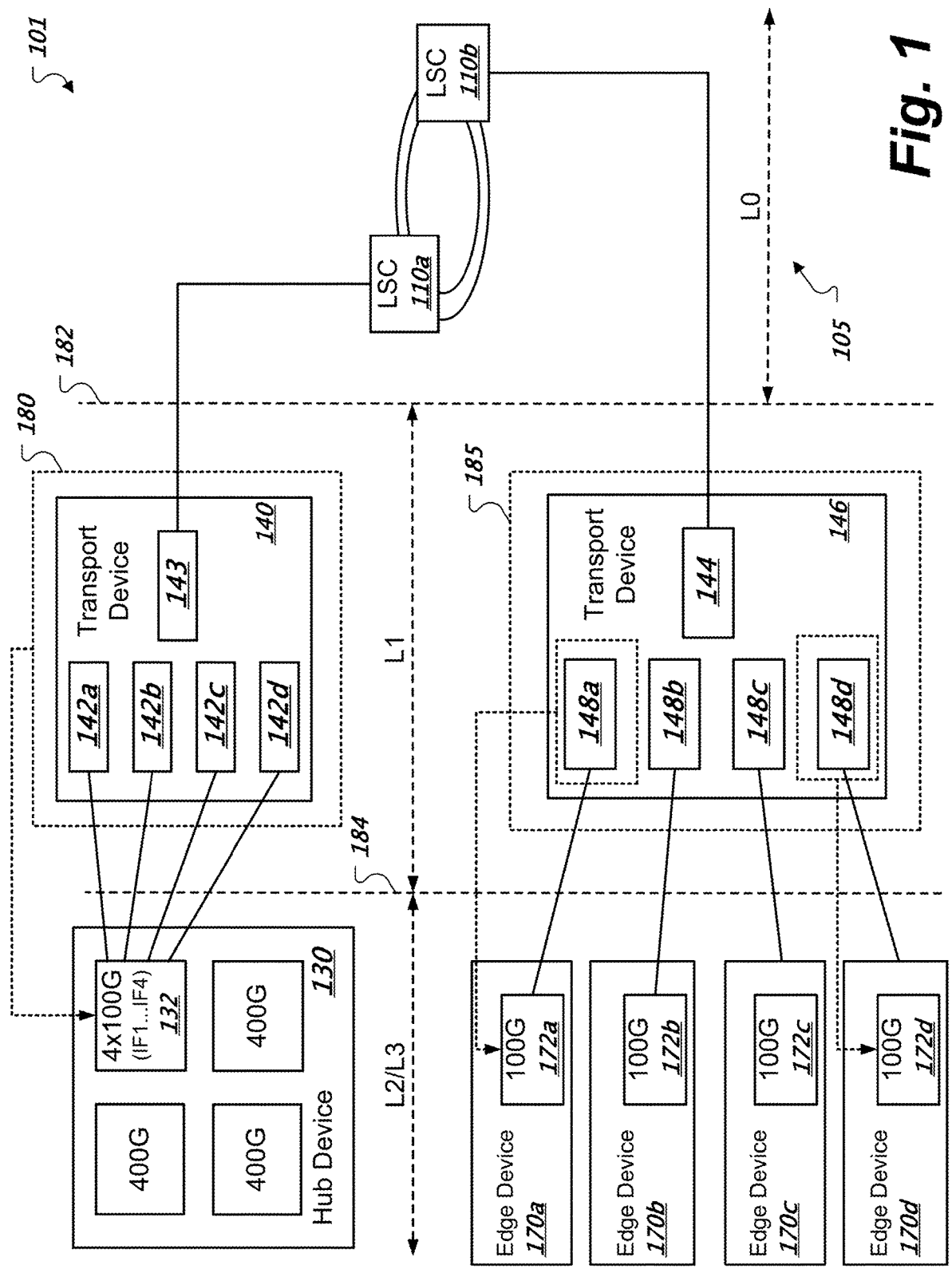
FIG. 1 shows a diagram of an example of an optical communication network.

A node such as a hub device within some optical communication networks may have to use separate optical transceivers for communications with respective edge devices within the network. The hub device, for example, may have to use four optical transceivers in one or more optical modules to communicate with four respective edge devices. As such, the hub device forms a point-to-point (P2P) optical connection with each edge device. Moreover, these networks may have to use transport devices to aggregate and disaggregate optical signals. A transport device, for example, can have multiple optical ports to connect with optical ports of a hub's optical transceivers. The transport device can aggregate the signals from the separate optical transceivers and output an aggregated optical signal for transmission in a line system. A downstream transport device can disaggregate the received signal for forwarding to edge devices over separate ports.

Newer types of optical modules can use higher bandwidth technologies to provide point-to-multipoint (P2MP) solutions based on coherent subcarrier aggregation (CSA). A CSA-based optical module can be referred to as an XR optical module. Rather than using separate optical transceivers and connections to communicate with each edge device, an XR optical module can use a single transceiver with a single connection to a line system for communications with multiple edge devices. Different optical subcarriers within a portion of optical spectrum, e.g., a channel, can be assigned to respective edge devices. Each edge device can receive the entire channel and convert its assigned optical subcarrier(s) within the channel into an electrical signal output through coherent detection and processing in a processor such as a digital signal processor (DSP). This can reduce or eliminate the need for transport devices within an optical communication network. Yet these optical modules can provide virtualized transport functionality.

Particular configurations of the technology described in this disclosure can be implemented so as to realize one or more of the following potential advantages. One or more of the described systems and techniques can reduce or eliminate the need for certain network equipment such as a transport device while still providing transport layer functionality. One or more of the described systems and techniques can decrease the time for interoperability testing with third parties. One or more of the described optical modules can be compliant with an existing industry standard, such that the host device requires minimal or no host configuration. One or more of the described systems and techniques can support standard N×M breakout cable configurations.

One or more of the described systems and techniques can increase operational efficiency within optical communication networks including improved auto-discovery of optical modules and multi-layer diagnostics. Providing auto-discovery of optical modules, over an OCC such as an OSC for example, can enable an operator via a network management system (NMS) to monitor and debug one or more layers of an optical communication networks such as the L0 layer. The operator can use the NMS to configure all potential optical modules at any time, including before a transport data path service is configured. The operator can use information obtained during auto-discovery to verify and debug L0 underlay connection status including installation and configuration errors. The operator can map the transport layer topology to L2/L3 services based on auto-discovery of a host port using a link layer discovery protocol (LLDP). The operator can view potential host port connectivity at any time including before data path service setup.

One or more of the described systems and techniques can improve service failure analysis and fault isolation, e.g., isolating a fault to a particular layer such as a transport layer or an IP layer, and can increase the accuracy of maintenance and IP service outage notification to those who will be impacted. One or more of the described systems and techniques can provide improved integration such as headless operations and faster integration with hosts without host software dependency. One or more of the described systems and techniques can provide an automated data path setup and automated optical subcarrier assignment by a hub device. On reboot (such as a power-on-reset or a cold reset), the system (including one or more optical modules) can automatically return to a previous state before the reboot. One or more of the described systems and techniques can automatically detect when an optical module is replaced with a new module and can automatically configure the new module. Automatically configuring the new module can quickly restore connectivity within an optical communication network. One or more of the described systems and techniques can detect connectivity failures and incorrect hub/edge connectivity and perform failure handling to maintain or restore data path traffic including automatic restoration to a pre-configured route.

In the context of the present disclosure, the terms "hub," "hub device," "hub host device," "hub node," and "primary node" can be used interchangeably. In addition, the terms "edge," "edge device," "edge host device," "edge node," "leaf," "leaf device," "leaf host device," "leaf node," and "secondary node" can be used interchangeably.

FIG. 1 shows a diagram of an example of an optical communication network 101. The optical communication network 101 includes a hub device 130, edge devices 170*a-d*, transport devices 140, 146, line system 105, and line system components 110*a-b*. In this example, the network 101 is arranged into different layers (L0 through L3). Vertical lines 182, 184 represent demarcations between layers. A first line 182 represents the demarcation between Layer 0 (L0) and Layer 1 (L1). A second line 184 represents the demarcation between L1 and Layer 2 (L2). Within the optical communication network 101, there can be established per layer operations, established interlayer demarcation points, and separate organizational teams for handling the layers. Layers L2 and L3 include the hub device 130 and the edge devices 170*a-d*.

Layer 1 (L1) includes transport devices 140, 146. The transport devices 140, 146 are situated between the hub and edge devices 130, 170*a-d* and the line system 105. The transport devices 140, 146 can be configured to aggregate data from the hub and edge devices 130, 170*a-d* via client ports 142*a-d*, 148*a-d* for transport on the line system 105 using DWDM ports 143, 144. The transport devices 140, 146 can be configured to receive data via DWDM ports 143, 144 from the line system 105 and disaggregate the received data for distribution among the client ports 142*a-d*, 148*a-d*. Each client port 142*a-d*, 148*a-d* can include an ingress port and an egress port.

Layer 0 (L0) includes the line system 105 and the line system components 110*a-b* such as optical amplifiers (e.g., erbium doped optical amplifiers), wavelength selective switches (WSSs), reconfigurable add-drop multiplexers (ROADMs), power splitters, power combiners, and optical multiplexers/demultiplexer (e.g., an arrayed waveguide grating). The line system 105 can include passive components, active components, or a combination thereof. In some implementations, the line system 105 uses dense wavelength division multiplexing (DWDM) to convey information over different optical wavelengths at the same time.

The hub device 130 can include one or more optical modules including optical module 132. In some implementations, the optical module 132 is compliant with a Quad Small Form-Factor Pluggable (QSFP) specification such as a QSFP double density (QSFP-DD) specification. Other types of module specifications are possible such as Octal Small Form-factor Pluggable (OSFP) or 100G Form factor Pluggable (CFP). The optical module 132 and hub device 130 can communicate with each other via a management bus, a management protocol, or both. In some implementations, the optical module 132 and hub device 130 can communicate in accordance with the Common Management Interface Specification (CMIS). In some implementations, the optical module 132 and hub device 130 can communicate via a Media Independent Interface (MII) in accordance with the Management Data Input/Output (MDIO) specification as defined by the IEEE 802.3 standards. MDIO can be referred to as a Serial Management Interface (SMI) or Media Independent Interface Management (MIIM).

The optical module 132 can include multiple optical transceivers. In this example, the optical module 132 is a 4×100G module that includes four separate transceivers and 100G ports that are respectively coupled with client ports 142*a-d*, with each 100G port providing communications to and from one of the edge devices 170*a-d*. The four 100G ports/transceivers of the optical module 132 can be controlled by separate interfaces (labelled IF1 through IF4).

Each 100G port of the optical module 132 can be coupled with a respective client port 142*a-d* of the hub-side transport device 140. The hub-side transport device 140 can include a DWDM port 143 which is coupled with a line system component 110*a* of the line system 105. The hub-side transport device 140 can aggregate data from client ports 142*a-d* and produce an aggregated optical signal via the DWDM port 143 for transmission on the line system 105.

On the edge side, the edge-side transport device 146 includes a DWDM port 144 which is coupled with a line system component 110*b* of the line system 105. The edge-side transport device 146 includes client ports 148*a-d* coupled with optical modules 172*a-d* of edge devices 170*a-d*. The edge-side transport device 146 can be configured to disaggregate data from the DWDM port 144 which is received from the line system 105 (e.g., output of DWDM port 143) for distribution among the client ports 148*a-d* to edge devices 170*a-d*.

The edge devices 170*a-d* can include optical modules 172*a-d*. The optical modules 172*a-d* can have respective optical connections with client ports 148*a-d* of the edge-side transport device 146. In some implementations, the optical modules 172*a-d* are compliant with a QSFP specification such as QSFP-DD. Other types of module specifications are possible such as OSFP or CFP. For each edge device 170*a-d* and respective optical module 172*a-d*, they can communicate with each other via a management bus, a management protocol, or both such as MDIO or CMIS. In some implementations, the optical modules 172*a-d* are 100G modules.

Newer types of optical modules, as previously discussed, can provide P2MP connectivity based on CSA. Instead of having multiple transceivers and connections to communicate with respective edge devices, a single transceiver/optical connection can be used to communicate with those edge devices. Different portions of an optical spectrum can be assigned to respective edge devices. The optical module 132 of the hub device 130 can be replaced, for example, with a 400G module having a single optical connection that provides the full 400G bandwidth (as opposed to four optical connections, with each connection only providing a quarter of the 400G bandwidth). Each optical module 172*a-d* of the edge devices 170*a-d* can receive the spectrum corresponding to the full 400G, but only processes its assigned optical subcarrier(s) within the received spectrum. This can eliminate the need for transport devices 140, 146 such that optical modules of the hub and edge devices can be directly coupled with line system components 110*a-b* of the line system 105. However, the transport functionality can be implemented within optical modules. For example, the logical transport function 180 of the hub-side transport device 140 can be virtualized within the hub's optical module 132, and the logical transport function 185 of the edge-side transport device 146 can be virtualized within the optical modules 172*a-d* of the edge devices 170*a-d*.

Figure 2:
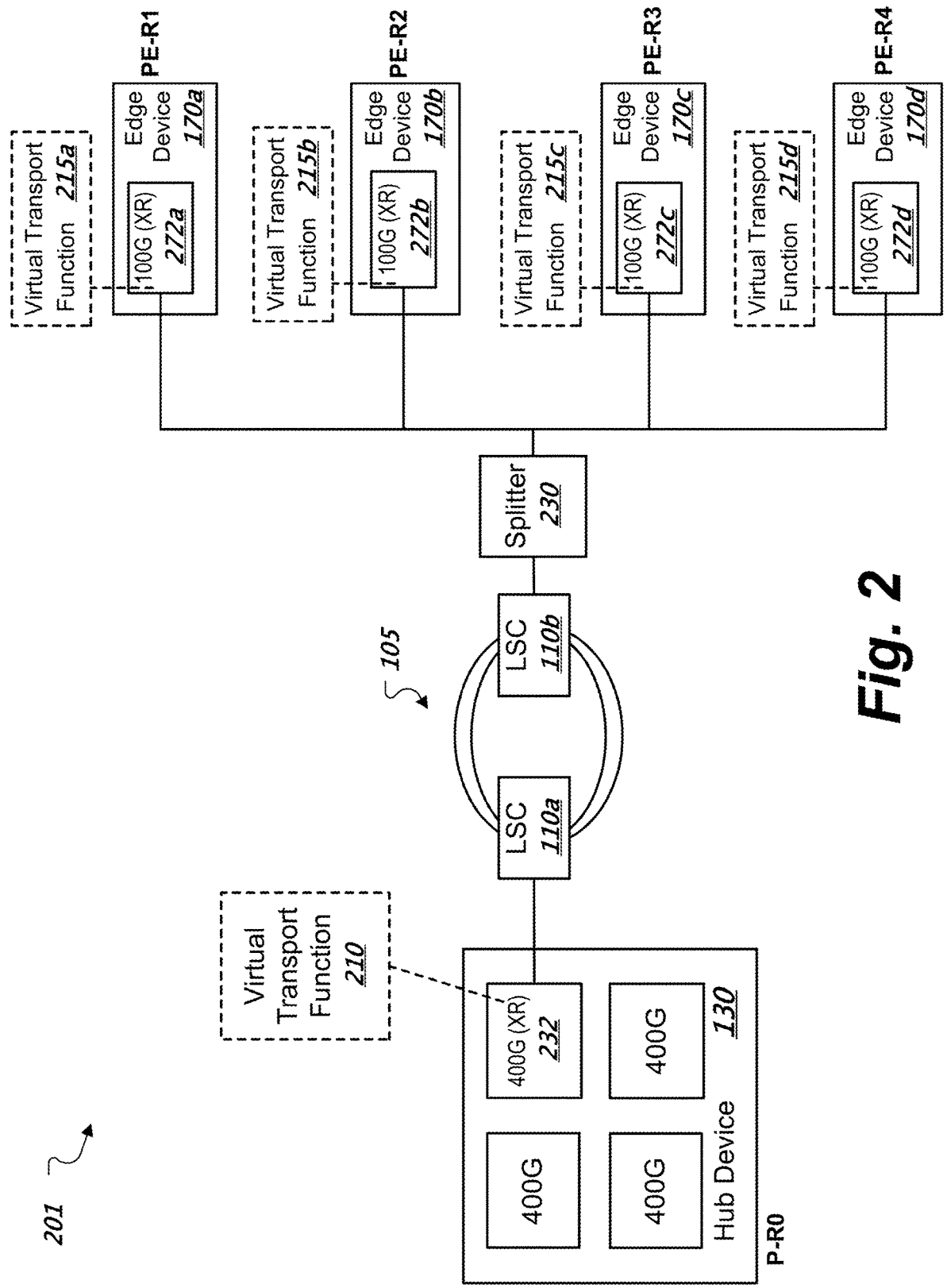
FIG. 2 shows a diagram of an example of an optical communication network which includes optical modules having virtual transport functions.

FIG. 2 shows a diagram of an example of an optical communication network 201 which includes optical modules having virtual transport functions. The optical communication network 201 includes a hub device 130 (labelled P-R0), edge devices 170*a-d* (labelled PE-R1, PE-R2, PE-R3, and PE-R4), line system 105, and line system components 110*a-b*. In this example, the optical communication network 201 includes a passive splitter 230 which provides the full optical spectrum output of the line system component 110*b* to each edge device 170*a-d*. Additionally, the splitter 230 can aggregate the outputs of the edge devices 170*a-d* for transmission into the line system 105.

The hub device 130 can include optical modules such as a 400G XR optical module 232. In some implementations, the 400G XR optical module 232 is compliant with a QSFP specification. Other types of module specifications are possible. The 400G XR optical module 232 can include a transceiver which takes a single carrier wavelength and divides it among multiple lower-bandwidth subcarriers based on CSA. This carrier wavelength can be generated by a single coherent laser within the transceiver. In some implementations, the optical output of a single laser within the module 232 can be divided into independently routable data streams using Nyquist subcarriers, where each data stream can be assigned to a respective edge device 170*a-d*. Each data stream can carry data on one or more subcarriers.

The edge devices 170*a-d* can include 100G XR optical modules 272*a-d*. In some implementations, the 100G XR optical modules 272*a-d* are compliant with a QSFP specification. Other types of module specifications are possible. Each 100G XR optical module 272*a-d* can receive the optical spectrum produced by the 400G XR optical module 232, and extract data carried by an assigned optical subcarrier(s) within the received portion of the spectrum. In some implementations, each of the 100G XR optical modules 272*a-d* extracts data carried by the assigned optical subcarrier(s) by filtering out optical subcarriers assigned to other modules.

The hub's 400G XR optical module 232 can include a virtual transport function 210. The virtual transport function 210 at the hub-side can provide the ability to cross-connect interfaces for respective edge devices 170*a-d* with their assigned optical subcarriers. Data packets can be forwarded to their intended edge devices 170*a-d* based on the cross-connections maintained by the virtual transport function 210. Similarly, the optical module 232 can receive data packets from edge devices 170*a-d* based on the cross-connections maintained by the virtual transport function 210.

The 100G XR optical modules 272*a-d* of the edge devices 170*a-d* can include respective virtual transport functions 215*a-d*. A virtual transport function 215*a-d* can provide the ability to cross-connect an edge interface of an optical module 272*a-d* with its assigned optical subcarrier(s) such that the edge interface is able to receive data carried by the assigned optical subcarrier(s) and to transmit data on the assigned optical subcarrier(s). The cross-connections maintained by the virtual transport functions 215*a-d* can be different given that each can have a different subcarrier assignment.

Figure 3:
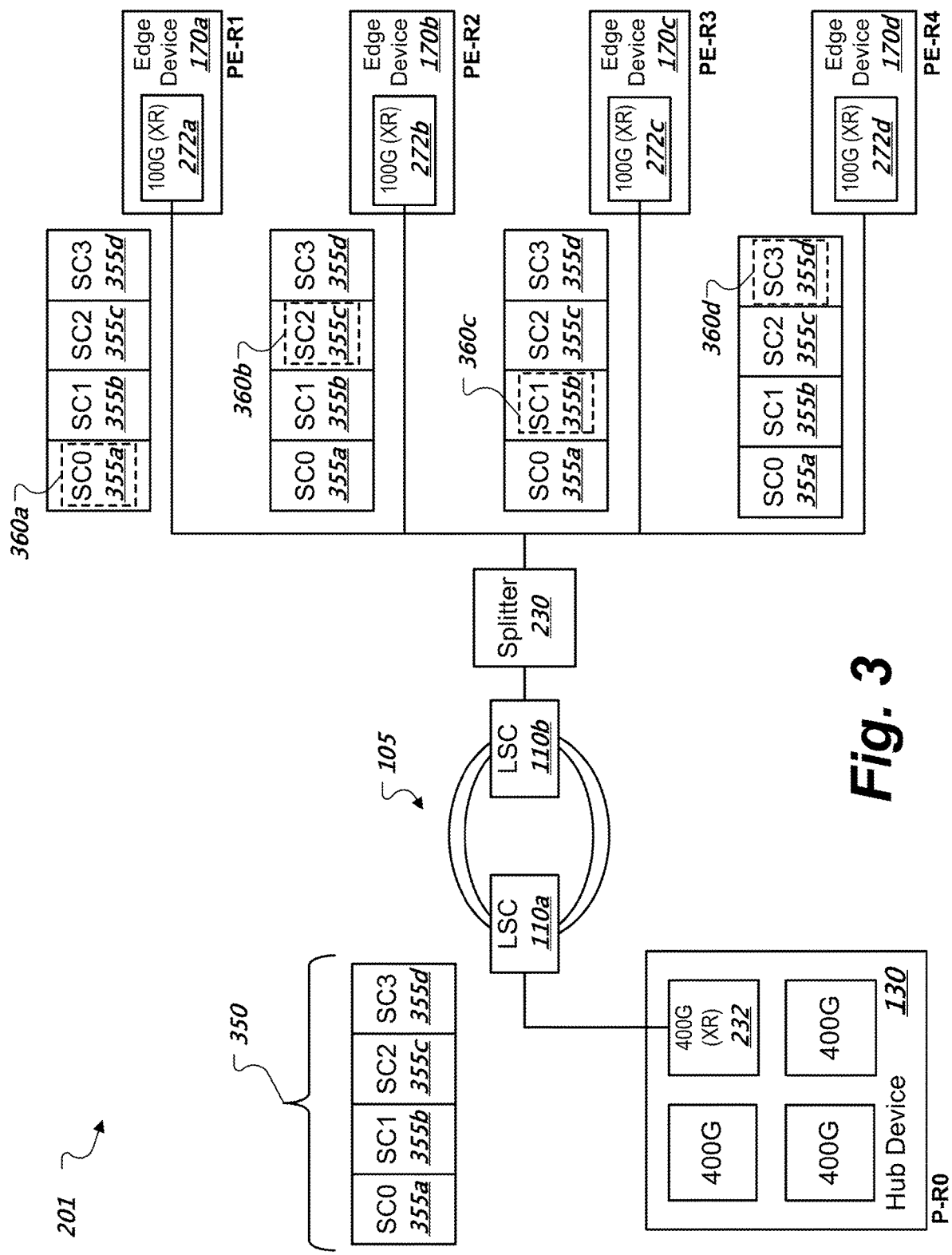
FIG. 3 shows an example of subcarrier assignments within the optical communication network of FIG. 2.

FIG. 3 shows an example of subcarrier assignments within the optical communication network 201 of FIG. 2. The hub's optical module 232 can output an optical signal that conveys information via subcarrier groups 350. Each edge device 170*a*-170*d* receives the hub's optical signal which conveys information via the subcarrier groups 350. The subcarrier groups 350 include multiple subcarriers 355*a*-355*d*. The subcarriers 355*a-d* can be assigned among the optical modules 272*a-d* of the edge devices 170*a-d*. In some implementations, a subcarrier group of the groups 350 includes a single subcarrier. In some implementations, a subcarrier group of the groups 350 includes multiple subcarriers.

In this example, subcarrier SC0 355*a* is assigned to edge device 170*a* (PE-R1) based on a first assignment 360*a*; subcarrier SC2 355*c* is assigned to edge device 170*b* (PE-R2) based on a second assignment 360*b*; subcarrier SC1 355*b* is assigned to edge device 170*c* (PE-R 3) based on a third assignment 360*c*; and subcarrier SC3 355*d* is assigned to edge device 170*d* (PE-R4) based on a fourth assignment 360*d*. In some implementations, in addition to receiving data, the subcarriers 355*a-d* can be used by the edge devices 170*a-d* to transmit data to the hub device 130. For example, the hub's optical module 232 can receive an optical signal which includes information transmitted on different subcarriers 355a-d by the optical modules 272a-d of the edge devices 170a-d.

Figure 4:
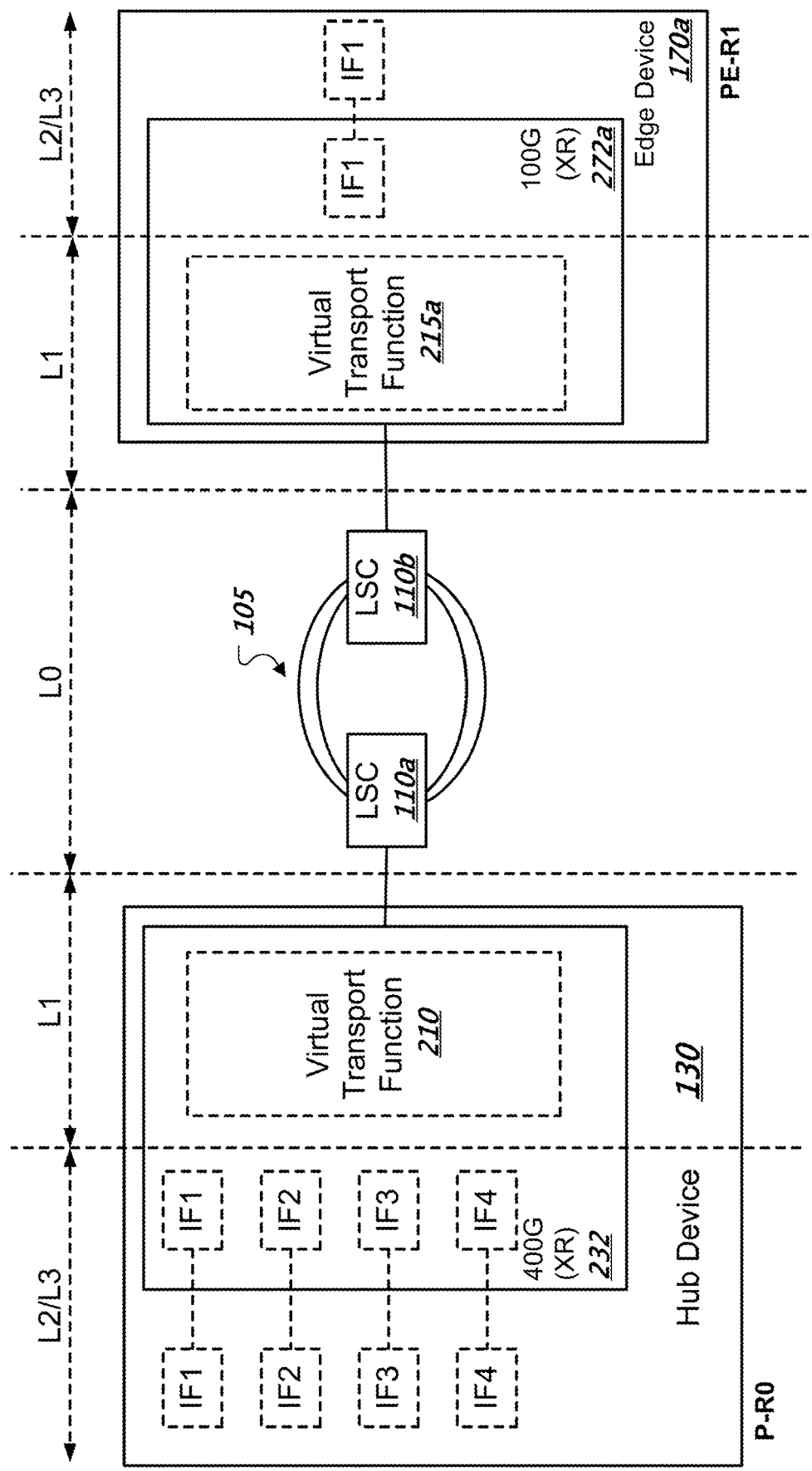
FIG. 4 shows examples of interface associations among interfaces within hub and edge devices of the optical communication network of FIG. 2.

FIG. 4 shows examples of interface associations among interfaces within hub and edge devices of the optical communication network 201 of FIG. 2. The 400G XR optical module 232 of the hub device 130 provides L1 functionality and L2/L3 functionality. In this example, the virtual transport function 210 of the 400G XR optical module 232 provides the L1 functionality. Likewise, the 100G XR optical module 272a-d of each edge device 272a-d provides L1 functionality and L2/L3 functionality. The virtual transport function 215a-d of each 100G XR optical module 272a-d provides the L1 functionality at the edge device 272a-d.

As depicted, the 400G XR optical module 232 includes four interfaces (labelled IF1, IF2, IF3, and IF4), which can be also referred to as hub-client interfaces. The interfaces can have respective hub interface identifiers. These interfaces can have different medium access control (MAC) addresses, e.g., the MAC address of IF1 is different from the MAC address of IF2, etc. A MAC address can also be referred to as a MAC identifier (MAC ID). The hub device 130 includes four corresponding interfaces (labelled IF1, IF2, IF3, and IF4). More or less numbers of interfaces are possible. In some implementations, each pair of interfaces can be considered the same logical interface with a host device side of the interface and optical module side of the interface. Each pair of interfaces can correspond to a specific optical module 272a-d and edge device 272a-d combination. For example, the IF1 interface pair can be assigned to the optical module 272a of the PE-R1 edge device 170a (labelled "PE-R1"). Accordingly, the hub device 130 would use the IF1 interface to transmit data to the PE-R1 edge device 170a.

Figure 5:
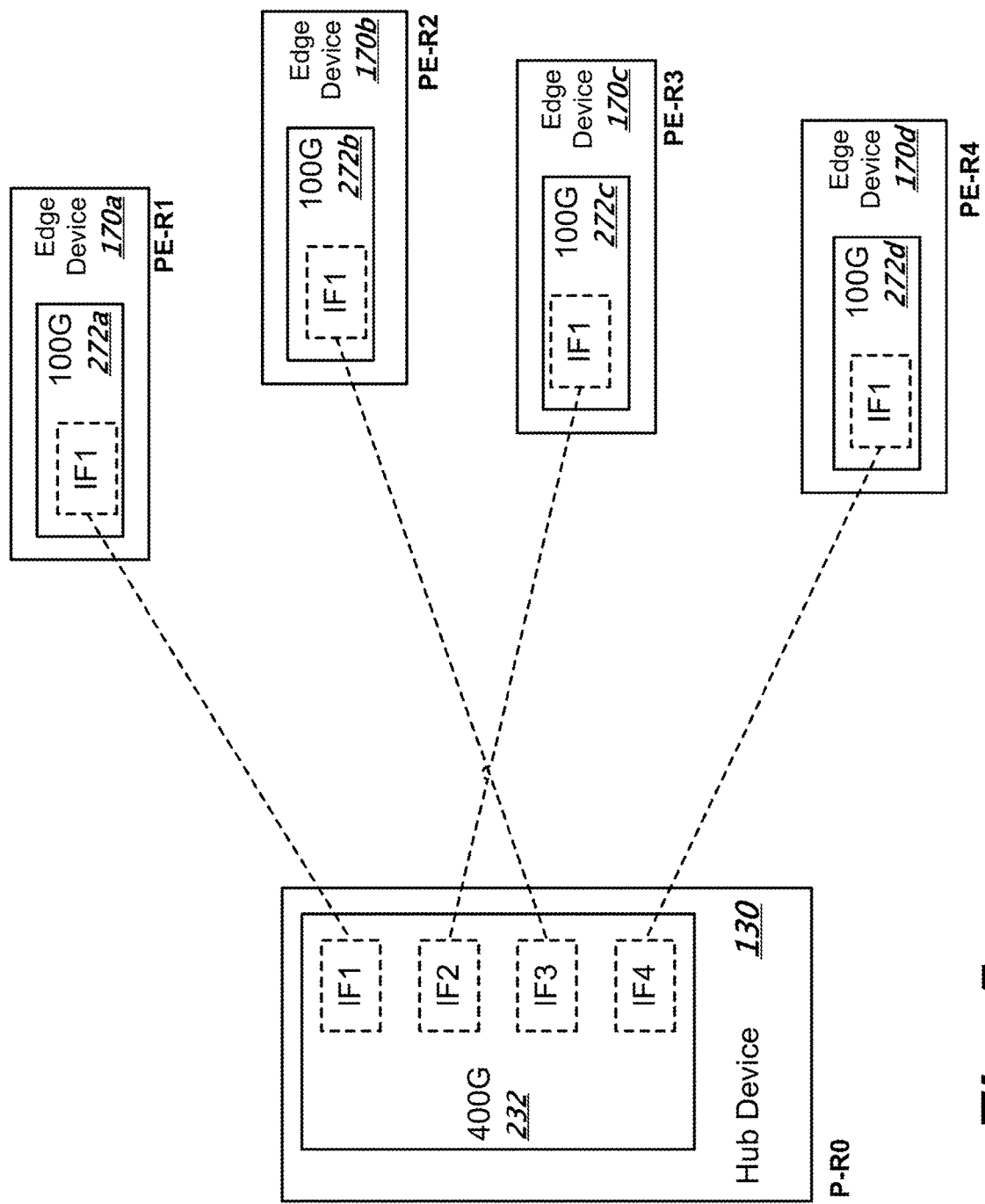
FIG. 5 shows examples of interface associations among hub interfaces and edge interfaces of devices of the optical communication network of FIG. 2.

FIG. 5 shows examples of interface associations among hub interfaces and edge interfaces of devices of the optical communication network 201 of FIG. 2. As discussed for FIG. 4, each pair of interfaces of the hub device 130 can correspond to a specific optical module 272a-d of an edge device 272a-d. In this example, the hub's IF1 interface is associated with IF1 of optical module 272a, hub's IF2 interface is associated with IF1 of optical module 272c, hub's IF3 interface is associated with IF1 of optical module 272b, and hub's IF4 interface is associated with IF1 of optical module 272d.

The optical module 232 of the hub device 130 can store associations among hub interfaces and edge interfaces in a memory. Based on the information shown in FIGS. 3, 4, and 5, TABLE 1 provides an example of such associations including the assigned subcarriers. The associations can be referred to as hub-edge interface associations.

TABLE 1

| Hub Interface Identifier | Edge Device Identifier | Assigned Subcarrier(s) |
| --- | --- | --- |
| IF1 | PE-R1 | SC0 |
| IF2 | PE-R3 | SC2 |
| IF3 | PE-R2 | SC1 |
| IF4 | PE-R4 | SC3 |

Similarly, the optical modules 272a-d of the edge device 272a-d can store an association between an edge interface and a hub interface. TABLE 2 provides an example of such an association including the assigned subcarrier(s) for the edge device 170a with the PE-R1 identifier.

TABLE 2

| Edge Interface Identifier | Hub Device Identifier | Assigned Subcarrier(s) |
| --- | --- | --- |
| IF1 | P-R0 | SC0 |

Figure 6A:
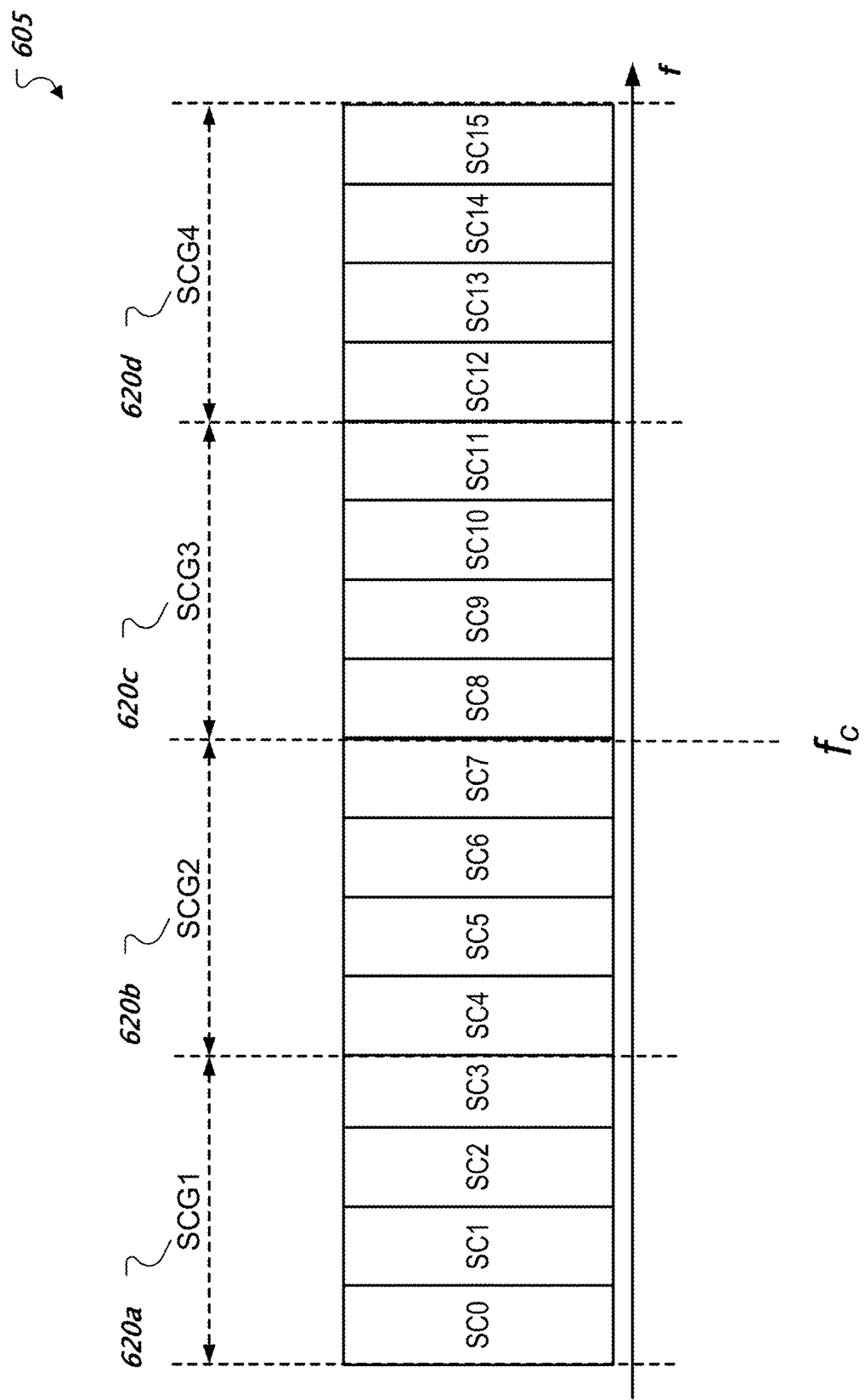
FIGS. 6A and 6B show examples of optical subcarrier arrangements.
Figure 6B:
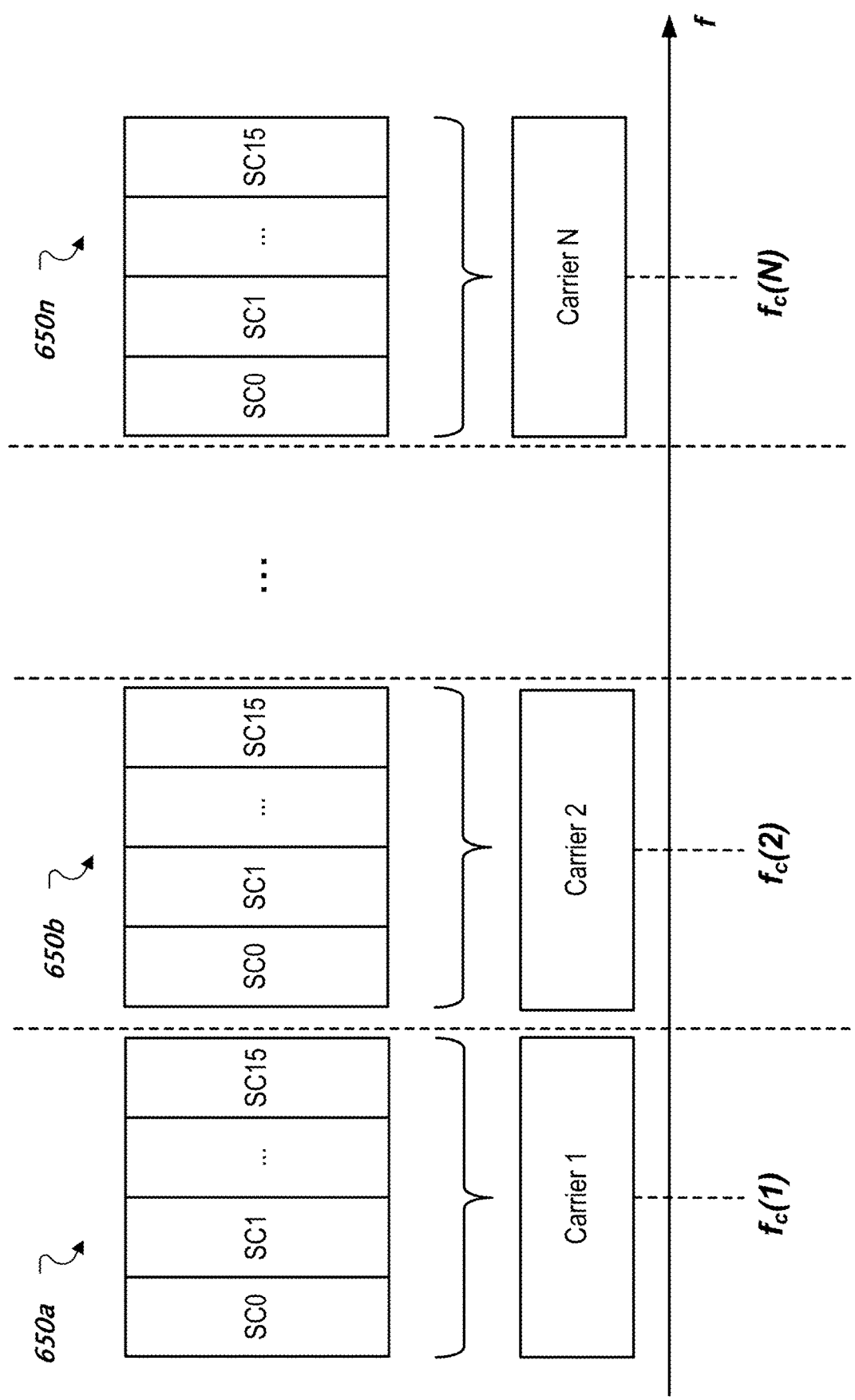

FIGS. 6A and 6B show examples of optical subcarrier arrangements. These optical subcarrier arrangements can be used for example in the optical communication network 201 of FIG. 2. In the example of FIG. 6A, an optical carrier 605 includes optical subcarriers (labelled SC0 to SC15). The optical carrier 605 can be associated with a carrier frequency ($f_c$).

The optical subcarriers, SC0 through SC15, can be generated by modulating light output from a laser. The frequency of such laser output light is $f_c$ and is typically a center frequency such that half the optical subcarriers (e.g., SC0 to SC7) are below f and half the subcarrier frequencies (e.g., SC8 to SC15) are above $f_c$. The carrier frequency $f_c$ can be a center frequency, e.g., the carrier frequency is at the center of an optical channel. In some implementations, the optical subcarriers can be defined as offsets from the carrier frequency. In some implementations, an offset for an optical subcarrier is based on an optical subcarrier index value.

The optical subcarriers, SC0 to SC15, can be arranged into four subcarrier groups 620a-620d. Each subcarrier group 620a-d (labelled SCG1, SCG2, SCG3, and SCG4) can be assigned for communications between optical modules of a hub device and a specific edge device. Other arrangements are possible. For example, the subcarrier groups 620a-d can have different numbers of assigned subcarriers. Further, the optical carrier 605 can have a different number of subcarriers than what is shown in FIG. 6A.

In some implementations, the subcarriers, SC0 to SC15, within the optical carrier 605 are Nyquist subcarriers. These Nyquist subcarriers can form a group of optical signals, each carrying data, where (i) the spectrum of each such optical signal within the group is sufficiently non-overlapping such that the optical signals remain distinguishable from each other in the frequency domain, and (ii) such group of optical signals is generated by modulation of light from a single laser. Each of these Nyquist subcarriers can have an optical spectral bandwidth that is at least equal to the Nyquist frequency, as determined by the baud rate of such subcarrier. In some implementations, an optical transceiver can use Nyquist shaping to digitally divide an optical carrier into multiple subcarriers. A Nyquist subcarrier can be referred to as a digital subcarrier (DSC).

In the example of FIG. 6B, there are N optical carriers 650a-n, which correspond to N optical channels. In some implementations, the carrier frequency $f_c(n)$ for a channel can be defined as a function of a channel number. As such, each optical carrier 650a-n has its own carrier frequency which is labelled $f_c(1)$ to $f_c(N)$. Further, each optical carrier 650a-n includes its own set of subcarriers (each labelled SC0 to SC15), which can be similar to those described above for FIG. 6A. The optical carriers 650a-n can correspond to different channels arranged on a predetermined grid. In some implementations, the optical carriers 650a-n are defined with respect to a grid having a predetermined grid spacing of 6.25 GHz with a base frequency of 193.1 THz. For example, the carrier frequency $f_c(n)$ of an optical carrier corresponding to the n-th channel on the grid can be given by: $f_c(n)=193.1$ THz$+(n\times 0.00625$ THz$)$. The channel numbers can be positive or negative and can include zero.

The optical subcarriers, SC0 to SC15, for an optical carrier 650a-n can be arranged into subcarrier groups, with each group assigned for communications between optical modules of a hub device and a specific edge device. The hub optical module can associate a different hub-client interface number for each assigned optical subcarrier group. The hub-client interface number can be used to select the appropriate subcarrier group for communications with a specific edge device. For example, different subcarrier groups can be assigned to the four optical modules 272a-d of FIG. 2. Further, the optical modules 272a-d can be respectively associated with hub-client interface numbers 1, 2, 3, and 4. In some implementations, a subcarrier group has its own carrier frequency within a channel which can be defined based on a hub-client interface number m and channel number n: $f_{scg-c}(n, m)=193.1$ THz+$((n+m)\times0.00625$ THz). In some implementations, n and m are integers, and the allowable values for n are separated by more than the maximum value allowed for m. For example, the allowable values for n are separated by 12 and $1 \leq m \leq 8$.

Figure 7:
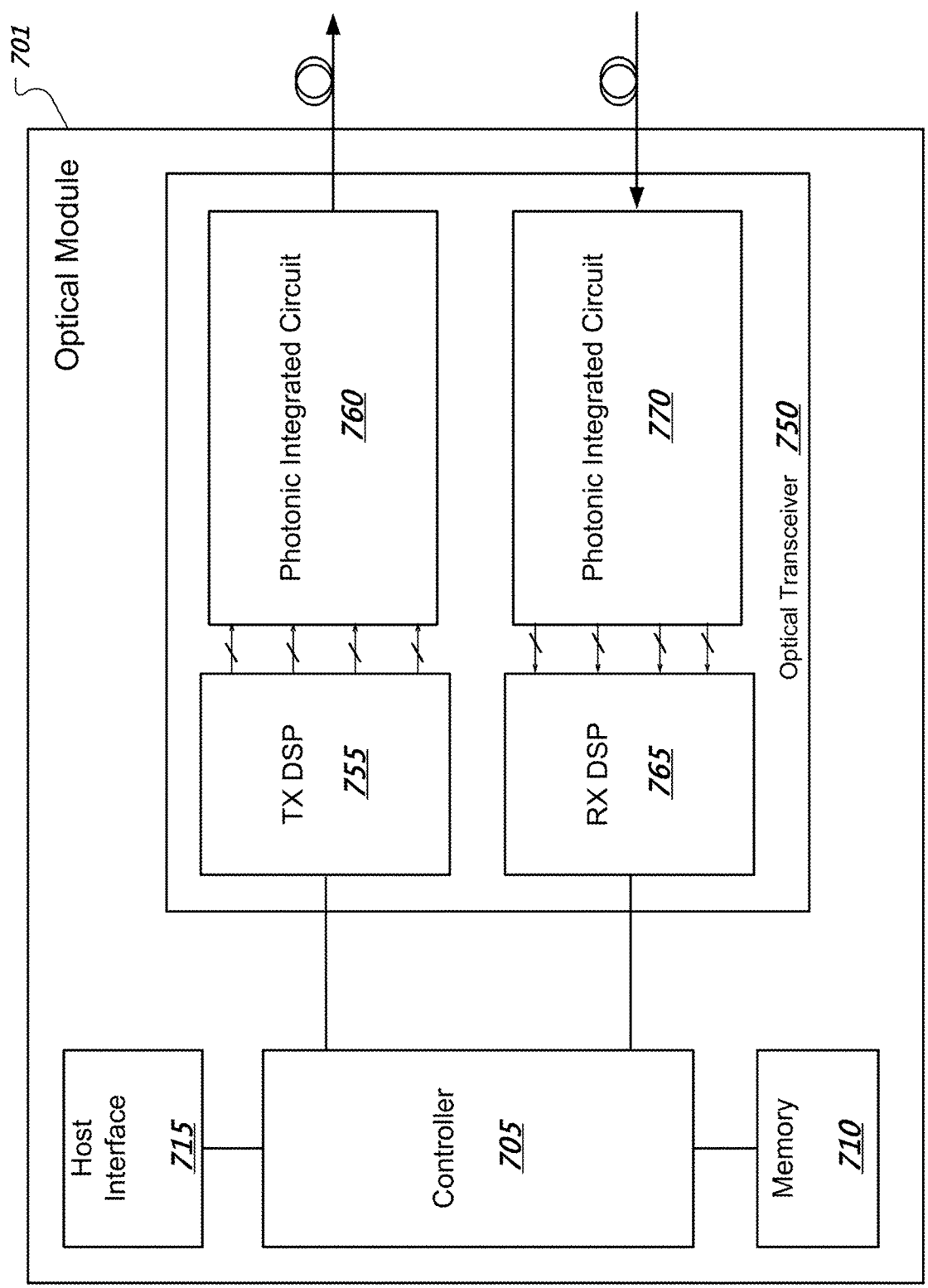
FIG. 7 is a diagram of an example of an optical module.

FIG. 7 is a diagram of an example of an optical module 701. The optical module 701 can be inserted into a host device such as a hub host device (e.g., hub device 130 of FIG. 2) or an edge host device (e.g., edge devices 170a-d of FIG. 2). In some implementations, the optical module 701 can be configured to be a hub optical module or an edge optical module. In some implementations, a hub version of the optical module 701 can include high-bandwidth circuitry for multiple concurrent communications over a range of optical subcarriers with different edge optical modules, e.g., an edge version of the optical module 701 having lower-bandwidth circuitry to communicate with the hub version using only a portion of optical subcarriers in the range of optical subcarriers. In some implementations, the optical module 701 is incorporated into a host device during manufacture. In some implementations, the optical module 701 is inserted in a host device after each has been manufactured.

The optical module 701 includes a controller 705, memory 710, host interface 715, and optical transceiver 750. The optical module 701 can communicate with the host device (e.g., hub device or edge device) via the host interface 715. Communications with the host device via host interface 715 can be in accordance with a standard such as CMIS or MDIO (e.g., IEEE 802.3). Other standards are possible. In some implementations, the optical module 701 is compliant with a QSFP specification such as QSFP-DD. Other types of module specifications are possible such as OSFP or CFP. In some implementations, the controller 705 can include one or more processors to perform operations. In some implementations, the controller 705 can include specialized and/or programmable logic to perform operations. The memory 710 can store instructions to cause the controller 705 to perform operations. The memory 710 can store one or more hub-edge interface associations and one or more optical subcarrier assignments. In the case where the optical module 701 is a hub optical module, the memory 710 can store hub-edge interface associations and optical subcarrier assignments associated with different edge devices that communicate with the optical module 701. In some implementations, the optical transceiver 750 includes one or more of the controller 705, host interface 715, or memory 710.

For egress communications, the optical transceiver 750 includes a transmit (TX) DSP 755 and a photonic integrated circuit (PIC) 760. For ingress communications, the optical transceiver 750 includes a receive (RX) DSP 765 and a PIC 770. In some implementations, a single DSP can perform the functionalities of multiple DSPs 755, 765. The optical transceiver 750 (including the components shown in FIG. 7) can include other components (not shown) such as a digital-to-analog convertor (DAC), analog-to-digital converter (ADC), optical filter, optical amplifier, etc.

The optical module 701 can advertise to the host device (e.g., hub device or edge device) one or more supported applications via the host interface 715. An application can define a supported combination of a host electrical interface and a module media interface, both of which can be based on industry standard specifications such as CMIS, and can provide configurations for signaling baud rate, optical signaling modulation format, and interface lanes. Advertising one or more supported applications can include sending one or more application select codes (ApSel). Upon receiving the ApSels, the host device can select the appropriate ApSel and notify the module 701 of the selection. In some implementations, one or more custom ApSels are advertised.

Figure 8:
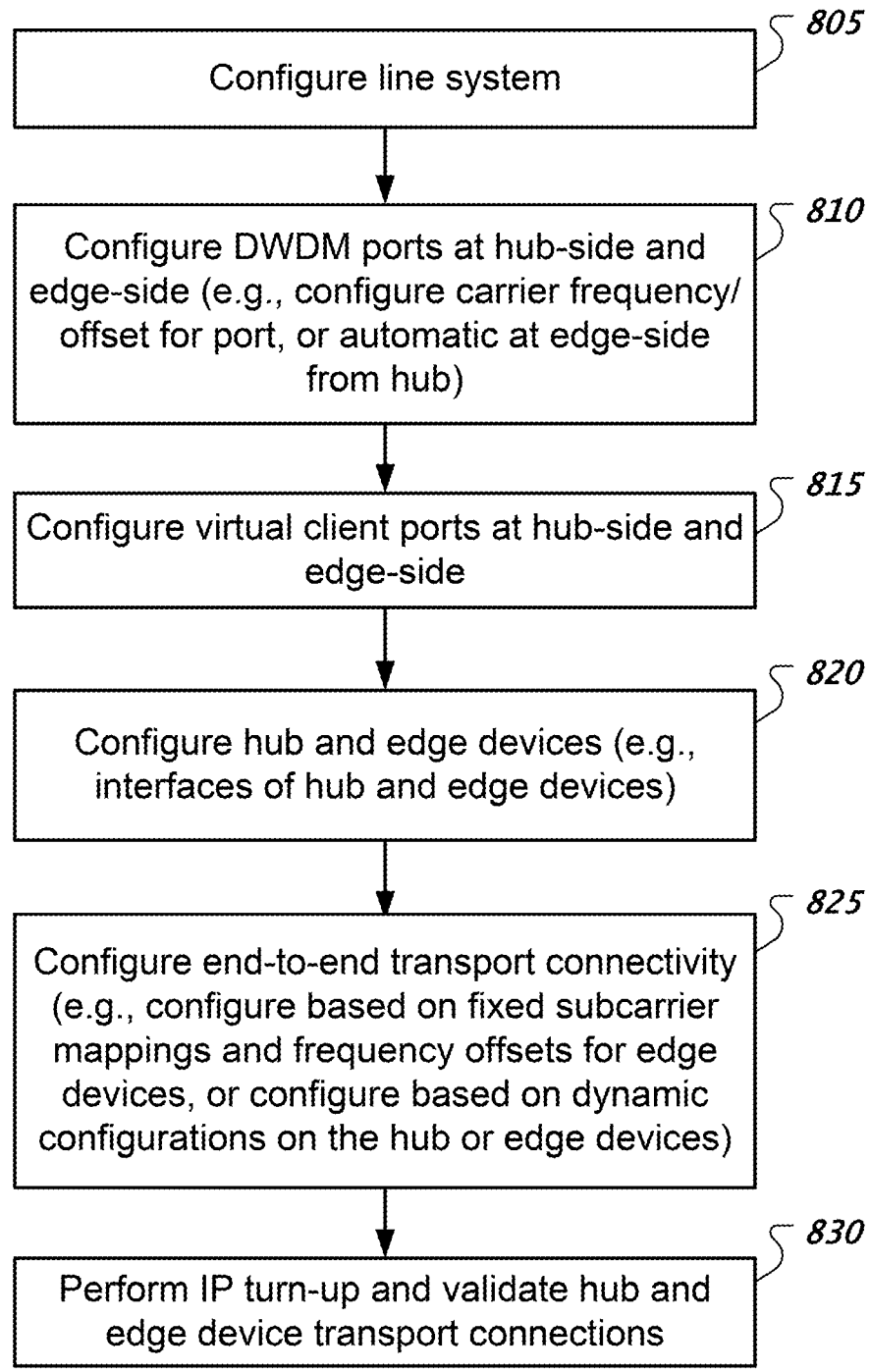
FIG. 8 is a flowchart of an example of a configuration process.

FIG. 8 is a flowchart of an example of a configuration process. The configuration process can be performed for an optical communication network such as the one shown in FIG. 2. At 805, the process includes configuring a line system. The line system can be active, passive, or a combination thereof. Configuring a line system can include configuring a passband, determining and setting parameters for a multiplexer (mux) or demultiplexer (demux), establishing demarcation parameters, or a combination thereof. Other types of configuration operations are possible.

At 810, the process includes configuring DWDM ports at hub-side and edge-side (e.g., configure carrier frequency/offset for a port, or automatic configuration at edge-side from hub). Configuring a hub-side DWDM port can include configuring a carrier frequency. In some implementations, configuring a hub-side DWDM port can include configuring a target carrier launch power, modulation type, or both. Configuring an edge-side DWDM port can include configuring a carrier center frequency, offset to a carrier center frequency, or both. In some implementations, configuring an edge-side DWDM port can include configuring a target subcarrier launch power per subcarrier, which can be automatic. In some implementations, the edge-side DWDM port configuration can be configured automatically by an external device such as a hub device or a configuration server.

At 815, the process includes configuring virtual client ports at hub-side and edge-side. Virtual client ports can be associated with different optical subcarrier groups, where the groups can be used for communications between optical modules of a hub device and respective edge devices. An optical module can advertise one or more codes, e.g., ApSels, corresponding to different applications supported by the module. The host device can use an advertised ApSel to cause the optical module to operate in accordance with the selected application. Different advertised applications can correspond to different operational modes of the module. In at least one operational mode used at the hub-side, the host device can cause the optical module to create one or more virtual client ports. These virtual client ports on the hub optical module can be mapped to different optical subcarrier groups, which are assigned to respective edge optical modules. The host device can further use an advertised ApSel to enable or disable the optical module and interface(s).

At 820, the process includes configuring hub and edge devices (e.g., interfaces of hub and edge devices). The transmit and receive directions can be independent. Configuring hub and edge devices can include configuring an Ethernet interface of a host device. Configuring hub and edge devices can include assigning one or more IP addresses. Configuring hub and edge devices can include enabling an interface. Configuring hub and edge devices can include enabling an interface of an optical module. After an interface is enabled, various overhead packets can be transmitted such as LLDP and Connectivity Fault Management (CFM). Other types of packets are possible.

At 825, the process includes configuring end-to-end transport connectivity. Configuring end-to-end transport connectivity at 825 can include setting one or more fixed subcarrier mappings and frequency offsets for edge devices. In some implementations, connectivity between a hub device and an edge device can be established using a fixed DSC mapping and frequency offset configured in the edge device. In some implementations, a host device can assume that this transport connectivity is consistent and maintained even after network failures.

Configuring end-to-end transport connectivity at 825 can include configuring optical modules based on dynamic configurations on the hub or edge devices. In some implementations, a server provides information regarding the dynamic configurations to optical modules of the hub or edge devices. Connectivity can be established using for example a configuration on the edge device such as the client interface to hub interface mapping. In some implementations, a host device can assume that this transport connectivity is consistent and maintained even after network failures. However, a configuration server may provide a new configuration after a network failure which may change one or more aspects of the transport connectivity.

At 830, the process includes performing IP turn-up and validating hub and edge device transport connections. Performing IP turn-up can include verifying hub to edge router and port connectivity. A system such as a NMS can use LLDP to verify local and remote device connectivity (e.g., Chassis ID) and port connectivity (e.g., Port ID). In some implementations, an operator uses an interface provided by the NMS to initiate LLDP. If there is an issue, the NMS can generate a notification about the issue (e.g., optical module issue, line system connectivity issue, incorrectly configured IP address, etc.). Performing IP turn-up can further include verifying IP connectivity.

In some implementations, configuration information can be requested and provided over an OCC. In some implementations, a configuration server provides configuration information to optical modules such as a hub optical module or an edge optical module.

Figure 9:
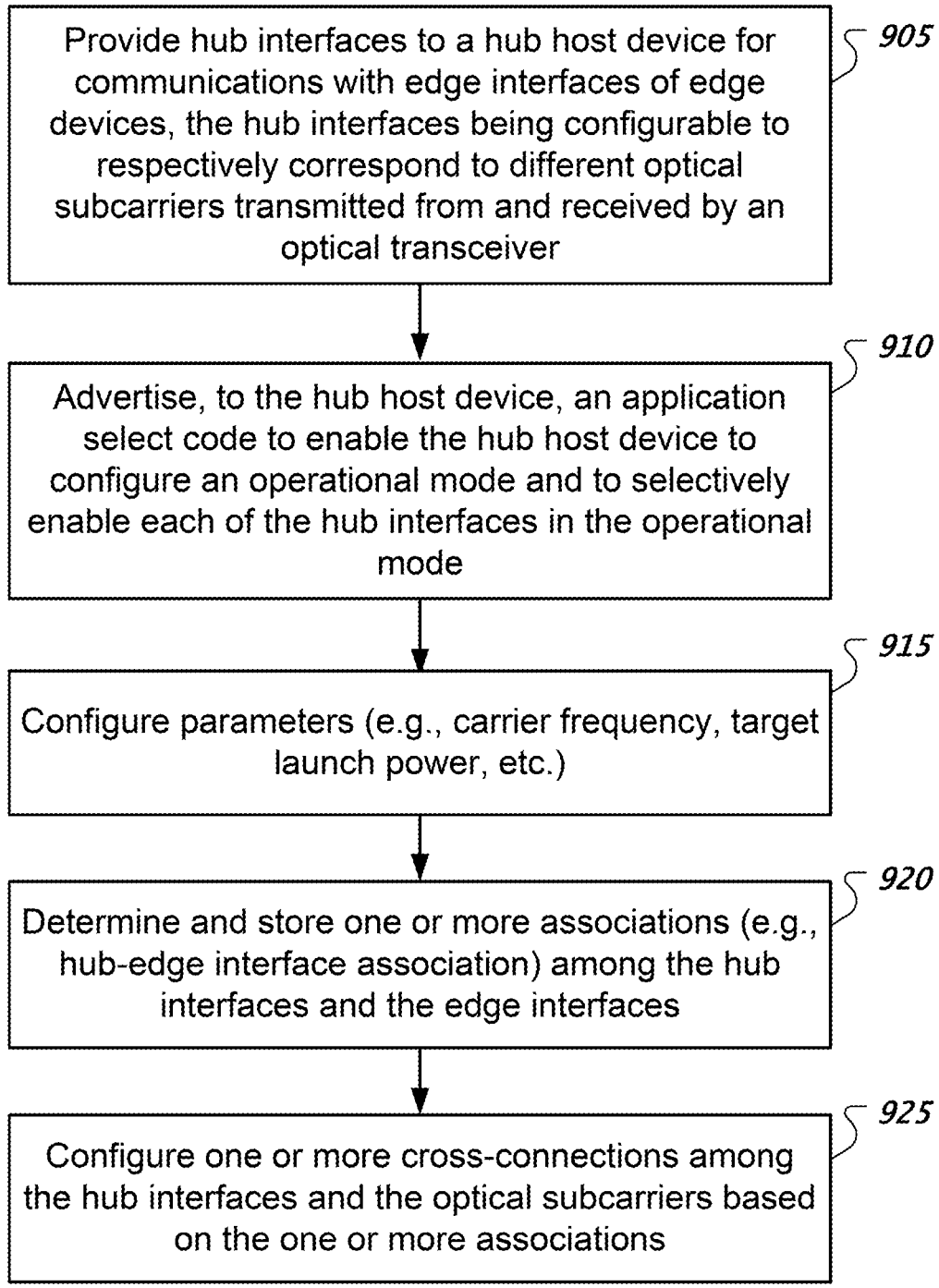
FIG. 9 is a flowchart of an example of a process performed by a hub optical module of a hub host device.

FIG. 9 is a flowchart of an example of a process performed by a hub optical module of a hub host device. At 905, the hub optical module (e.g., 400G XR optical module 232 of FIG. 2) provides hub interfaces to the hub host device (e.g., hub device 130) for communications with edge interfaces of edge devices. Providing hub interfaces to the hub host device can include initializing one or more data structures for creation of a data pathway between the hub optical module and the hub host device for each hub interface. The hub interfaces can be associated with different edge optical modules. The hub host device can use the hub interfaces to send data to and receive data from respective edge optical modules. The hub interfaces can be configured to respectively correspond to different optical subcarriers transmitted from and received by an optical transceiver. The hub optical module, for example, can provide multiple interfaces corresponding to respective virtual transponders, each configurable with a different subcarrier group. However, a single physical transponder/transceiver within the optical module can handle the physical communications for each of the virtual transponders.

At 910, the hub optical module advertises, to the hub host device, an application select code to enable the hub device to configure an operational mode and to selectively enable each of the hub interfaces in the operational mode. In some implementations, the hub host device 130 can configure the 400G XR optical module 232 for a 4×100G operational mode. A hub host device, such as a QSFP-DD host can use an ApSel value advertised by the hub optical module to configure it for the 4×100G operational mode. In this mode, each virtual client port is assigned a part of the overall bandwidth, e.g., optical subcarriers forming the overall 400G bandwidth are distributed among four virtual client ports such that each virtual client port is capable of 100G. In some implementations, different overall bandwidths are possible (e.g., 600G, 800G, etc.), uneven distributions of subcarriers among ports are possible, and more or less virtual client ports are also possible.

At 915, the hub optical module configures parameters (e.g., carrier frequency, target launch power, etc.). In some implementations, the hub optical module configures a carrier frequency. A hub host device such as a QSFP-DD host can configure a grid spacing parameter to be 6.25 GHz and configure a carrier frequency, e.g., center frequency, based on the grid spacing parameter and an assigned channel number (e.g., center frequency for channel number 'n' is $f(n)=193.1$ THz+n×0.00625 THz). In some implementations, the hub optical module can configure a target launch power.

At 920, the hub optical module determines and stores one or more associations (e.g., hub-edge interface association) among the hub interfaces and the edge interfaces. Determining associations can include retrieving configuration information from a configuration server. In some implementations, the configuration information includes optical subcarrier assignments. Determining associations can include retrieving a list of hub interface identifiers and assigning edge devices to the interfaces respectively. A memory within the hub optical module can include association records which each containing a hub interface identifier and an identifier corresponding to its associated edge device. In some implementations, the hub interface identifier can be an enumerated hub-client interface value. An association record can include information regarding an assigned optical subcarrier(s).

At 925, the hub optical module configures one or more cross-connections among the hub interfaces and the optical subcarriers based on the one or more associations. In some implementations, configuring one or more cross-connections includes configuring one or more transmit data pathways such that data packets arriving from the host device on a specific hub interface are transmitted to their intended edge device using the subcarrier(s) assigned to that edge device. Configuring one or more cross-connections includes configuring one or more receive data pathways such that data packets received on a specific optical subcarrier is forwarded to the host device on the interface associated with the optical subcarrier.

Figure 10:
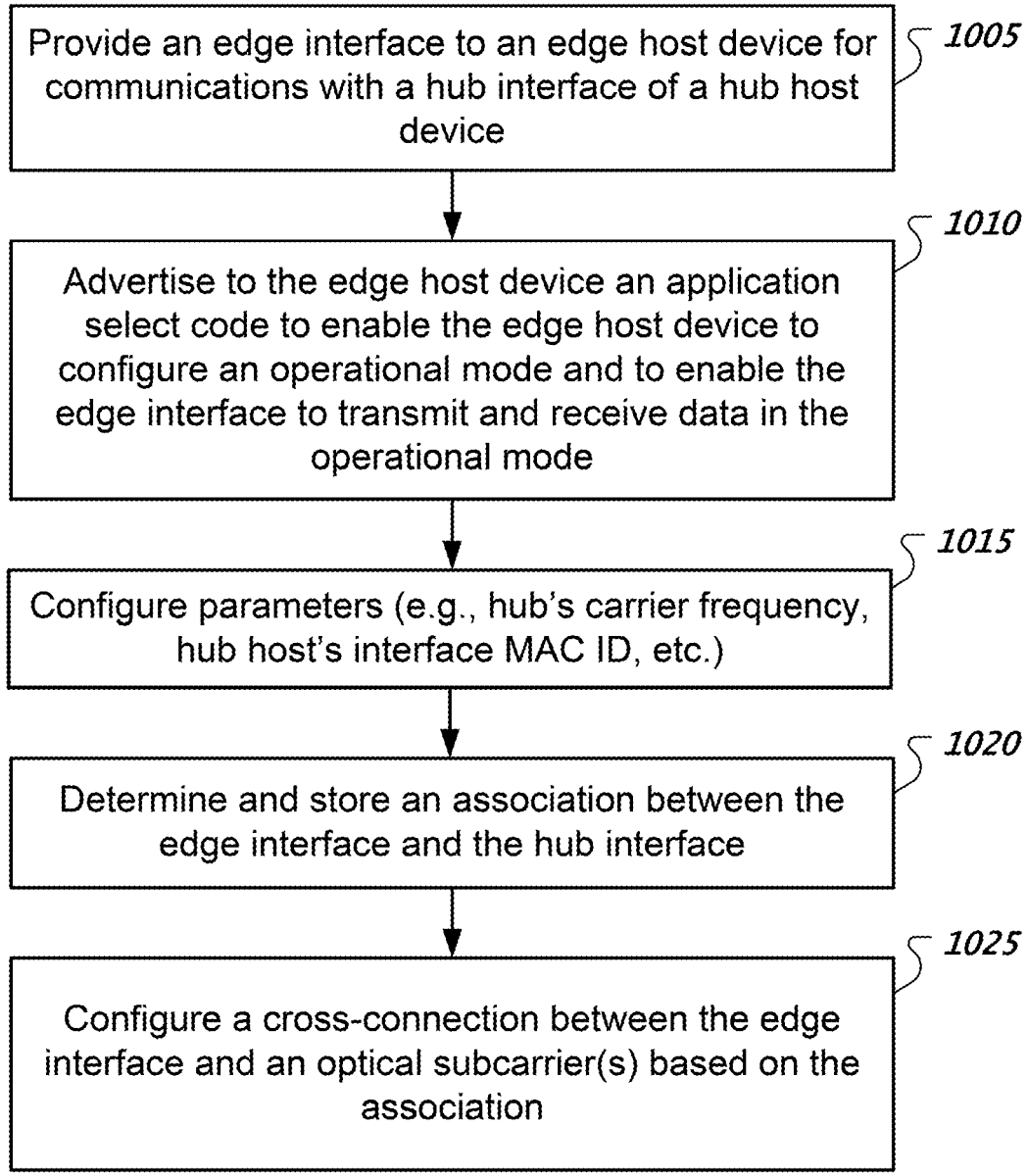
FIG. 10 is a flowchart of an example of a process performed by an edge optical module of an edge host device.

FIG. 10 is a flowchart of an example of a process performed by an edge optical module of an edge host device. At 1005, the edge optical module (e.g., 100G XR optical module 272a-d of FIG. 2) provides an edge interface to the edge host device for communications with a hub interface of a hub host device. Providing the edge interface to the edge host device can include initializing one or more data structures for creation of a data pathway between the edge optical module and the edge host device for the edge interface. The edge host device can use the edge interface to send data to the edge optical module for transmission or receive data from the edge optical module.

At 1010, the edge optical module advertises, to the edge host device, an application select code to enable the edge host device to configure an operational mode and to enable the edge interface to transmit and receive data in the operational mode. An edge host device, such as a QSFP-DD host for example, can use an ApSel value advertised by the edge optical module to configure it for the 1×100G operational mode.

At 1015, the edge optical module configures parameters (e.g., hub's carrier frequency, hub host's interface MAC ID, etc.). In some implementations, the edge optical module configures a carrier frequency. In some implementations, a hub's carrier frequency is detected and accordingly used by the edge optical module. In some implementations, the carrier frequency can be determined based on the hub's carrier frequency and a parameter such as a hub-client interface value or a subcarrier group index. In some implementations, the edge optical module configures a hub host's interface MAC ID. The edge optical module can perform discovery to obtain the MAC ID of the hub host's interface. The MAC ID can also be referred to as a MAC address.

At 1020, the edge optical module determines and stores an association between the edge interface and the hub interface. Determining an association can include retrieving configuration information over OCC, a configuration server, or a combination thereof. Retrieved configuration information can include an interface identifier such as a hub-client interface value, optical subcarrier assignment information, or both. Other or additional retrieved configuration information is possible. A memory within the edge optical module can include an association record containing a hub-client interface value and an identifier corresponding to its associated hub device. An association record can include information regarding an assigned optical subcarrier(s).

At 1025, the edge optical module configures a cross-connection between the edge interface and an optical subcarrier(s) based on the association. In some implementations, configuring a cross-connection includes configuring a transmit data pathway such that data packets arriving from the edge host device on a local interface are transmitted to the hub device using the subcarrier(s) assigned to the edge device. Configuring one or more cross-connections includes configuring a receive data pathway such that data packets received on an optical subcarrier assigned to the edge optical module are forwarded to the edge host device. In some implementations, the edge optical module uses the cross-connection to extract data from its assigned optical subcarrier and not process information on optical subcarriers assigned to other modules or otherwise not assigned.

The edge optical module can cause an optical transceiver in the module to tune to a portion of optical spectrum such that it can transmit or receive one or more optical signals containing one or more optical subcarriers assigned for communications between the hub optical module and the edge optical module. In some implementations, the hub optical module transmits an identification of the assigned optical subcarrier(s) to the edge optical module in a packet.

Figure 11A:
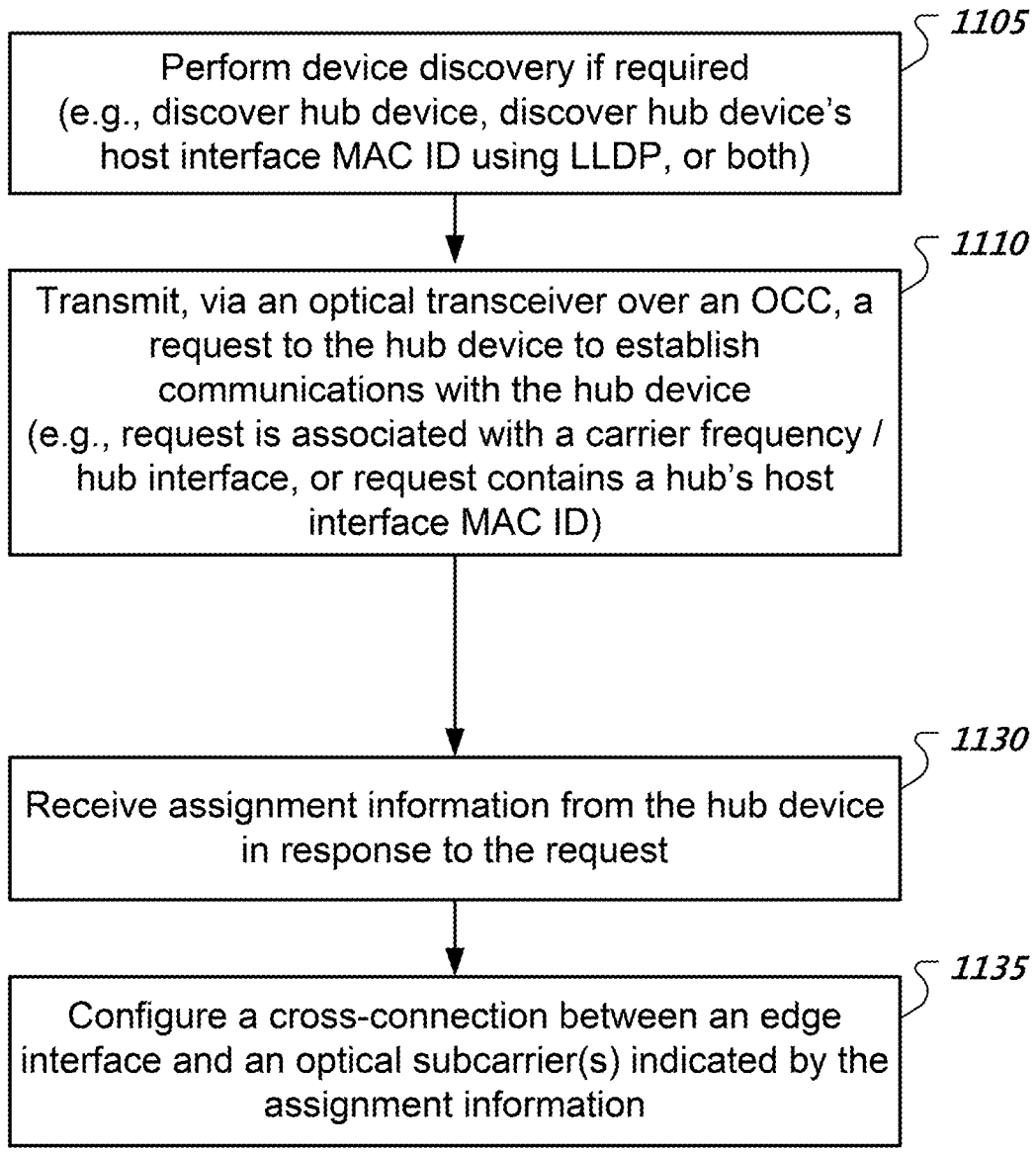
FIGS. 11A and 11B are flowcharts of an example of discovery and configuration processes.
Figure 11B:
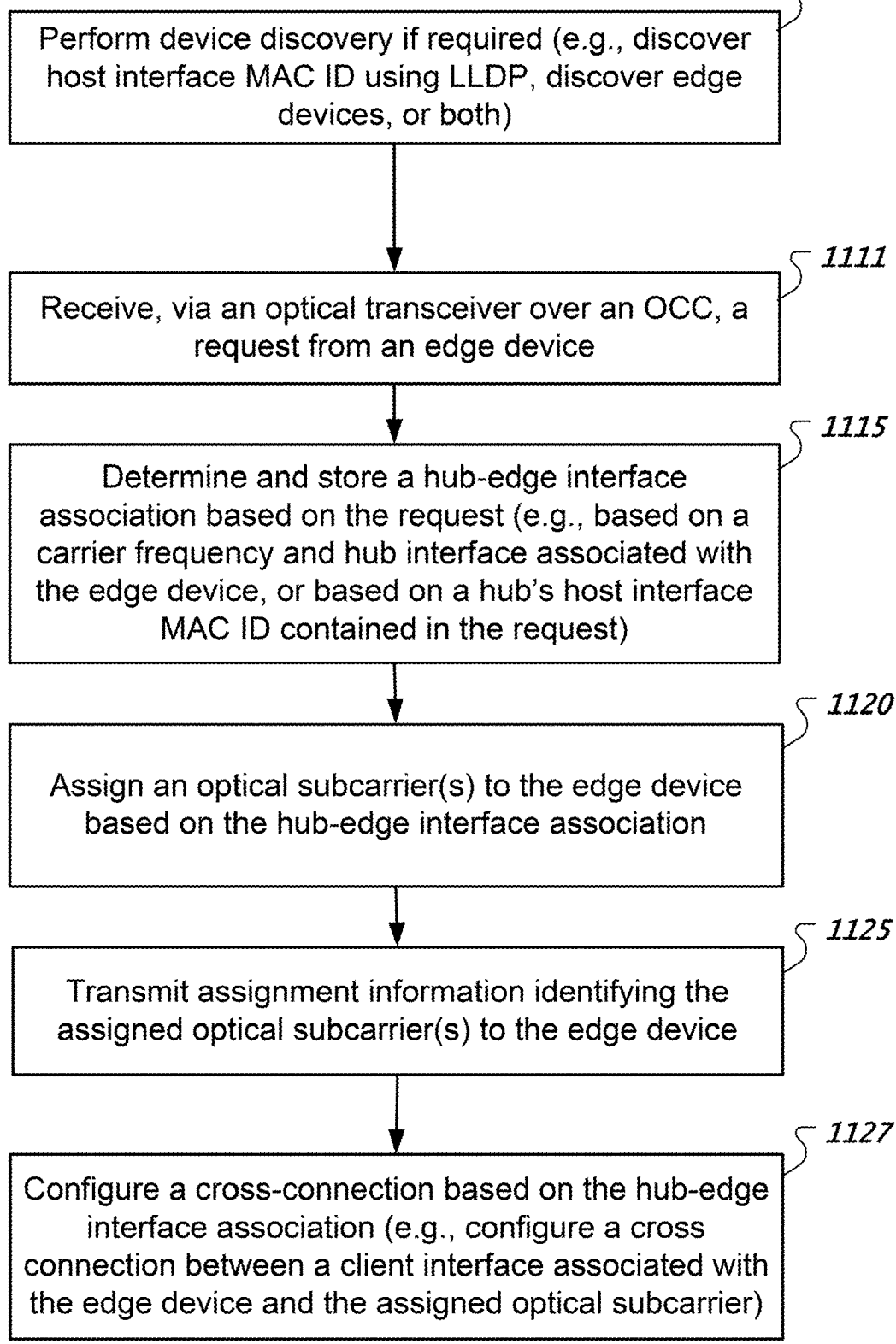

FIGS. 11A and 11B are flowcharts of an example of discovery and configuration processes. FIG. 11A is a flowchart of an example of a discovery and configuration process performed by an optical module of an edge device, which can be referred to as an edge optical module (such as optical modules 272a-272d). FIG. 11B is a flowchart of an example of a discovery and configuration process performed by an optical module of a hub device, which can be referred to as a hub optical module (such as optical module 232).

Referring to FIG. 11A, at 1105, the edge optical module performs device discovery if required. In some implementations, one or more configuration parameters control whether the edge optical module performs device discovery. Device discovery can include discovery of a hub device, discovery of a hub device's host interface MAC ID using LLDP, or both. Other types of device discovery are possible. In some implementations, device discovery includes sending (over OCC or a non-optical channel for example) a discovery request and listening for responses to the discovery request.

At 1110, the edge optical module transmits, via an optical transceiver over an OCC, a request to the hub device to establish communications with the hub device. In some implementations, the request is associated with a carrier frequency, hub interface, or both. The request, for example, can include a carrier frequency identifier, interface identifier, or both. In some implementations, the request contains a hub's host interface MAC ID which can be obtained at 1105 or obtained from another source such as a configuration server or a local configuration storage. FIG. 11B (discussed below) provides an example of how a hub device receives the request and provides a response.

At 1130, the edge optical module receives assignment information from the hub device in response to the request. In some implementations, the assignment information includes an optical subcarrier identifier such as an index or range of subcarriers. In some implementations, the assignment information includes a value such as a hub interface identifier and the optical modules retrieves assignment information from a lookup table based on the value. In some implementations, the assignment information includes a channel number and a hub interface identifier, and the edge optical module determines the optical subcarrier based on the channel number and the hub interface identifier.

At 1135, the edge optical module configures a cross-connection between an edge interface and an optical subcarrier(s) indicated by the assignment information. The edge optical module can cause an optical transceiver in the module to tune to a portion of optical spectrum containing the assigned optical subcarrier(s) and to extract information carried by the optical subcarrier(s).

Referring to FIG. 11B, at 1107, the hub optical module performs device discovery if required. In some implementations, one or more configuration parameters controls whether the edge optical module performs device discovery. Device discovery can include discovery of a host interface MAC ID using LLDP, discovery of edge devices, or both. Other types of device discovery are possible.

At 1111, the hub optical module receives, via an optical transceiver over an OCC, a request from an edge device (see, e.g., request transmitted at 1110 in FIG. 11A). In some implementations, the request is associated with a carrier frequency, hub interface, or both. The request, for example, can include a carrier frequency identifier, interface identifier, or both. In some implementations, the request contains a hub's host interface MAC ID.

At 1115, the hub optical module determines and stores a hub-edge interface association based on the request. Storing a hub-edge interface association can include storing a hub interface identifier and an edge device identifier. The hub interface identifier can be associated with a hub interface that is assigned to handle communications with the edge device. In some implementations, the controller receives information from a configuration server that provides hub-edge interface associations for the edge devices. In some implementations, the hub optical module determines a hub-edge interface association based on a carrier frequency and hub interface associated with the edge device. In some implementations, the hub optical module determines a hub-edge interface association based on a host interface MAC ID contained in the request.

At 1120, the hub optical module assigns an optical subcarrier(s) to the edge device based on the hub-edge interface association. In some implementations, the assigned optical subcarrier(s) is within a channel associated with a carrier frequency. In some implementations, the hub optical module assigns multiple optical subcarriers to the edge device, where the subcarriers can be contiguous, noncontiguous, or a combination thereof. In some implementations, the assigned optical subcarriers are contiguous within a range of subcarriers, where one or more guard bands separate the subcarriers. In some implementations, the assigned optical subcarrier can be selected based on the channel number and the hub interface identifier. In some implementations, hub interfaces are assigned to different ranges of optical subcarriers within a channel, and hub interface identifiers corresponding to the hub interfaces correspond to respective optical subcarrier ranges.

At 1125, the hub optical module transmits assignment information identifying the assigned optical subcarrier(s) to the edge device. In some implementations, one or more numerical indices corresponding to respective subcarriers are used to identify one or more assigned subcarriers. In some implementations, the assignment information includes a channel number and a hub interface identifier of an interface assigned to handle communications with the edge device.

At 1127, the hub optical module configures a cross-connection based on the hub-edge interface association. For example, the hub optical module can configure a cross-connection between a client interface associated with the edge device and the assigned optical subcarrier(s). The cross-connection can be used to route information from hub interfaces to assigned optical carriers. After causing the optical transceiver to tune to a channel, the hub optical module, for example, can receive data from the hub device via a hub interface of the hub interfaces that is assigned to handle communications with the edge device, and use the assigned optical subcarrier within the channel to transmit the data to the edge device.

Figure 12:
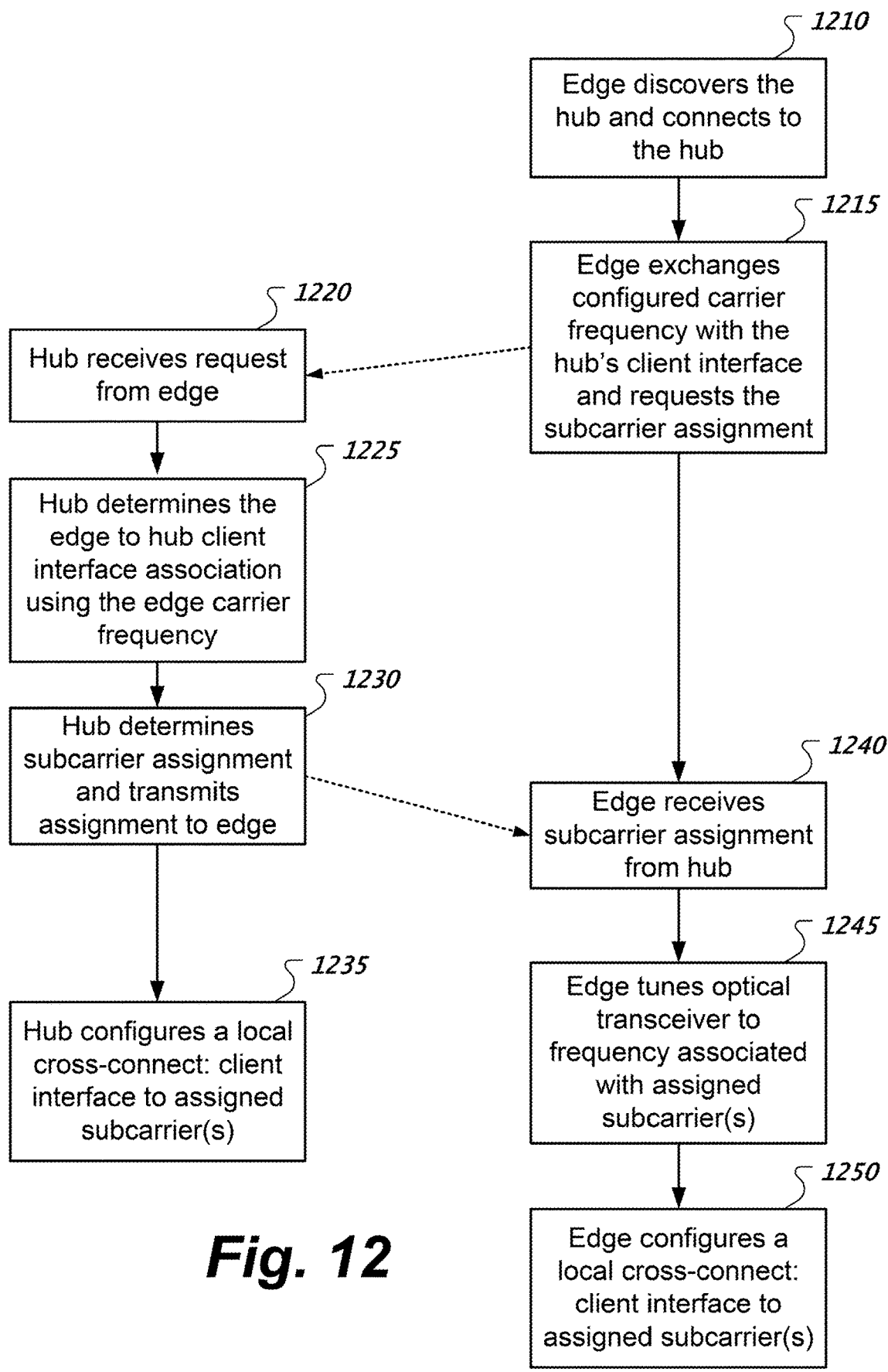
FIG. 12 is a flowchart of an example of discovery and configuration processes based on a predetermined carrier frequency.

FIG. 12 is a flowchart of an example of discovery and configuration processes based on a predetermined carrier frequency. These processes can be performed by hub and edge optical modules. At 1210, the edge optical module discovers the hub optical module and connects to the hub optical module. At 1215, the edge optical module exchanges a configured carrier frequency with the hub's client interface and requests the subcarrier assignment.

At 1220, the hub optical module receives the request from the edge optical module. At 1225, the hub optical module determines the edge optical module to hub client interface association using the edge carrier frequency associated with the request. At 1230, the hub optical module determines a subcarrier assignment and transmits the assignment to the edge optical module. At 1235, the hub optical module configures a local cross-connect between the client interface and the assigned subcarrier(s).

At 1240, the edge optical module receives the subcarrier assignment from the hub optical module. At 1245, the edge optical module tunes an optical transceiver in the module to a carrier frequency associated with the assigned subcarrier(s). At 1250, the edge optical module configures a local cross-connect between its client interface and the assigned subcarrier(s).

Figure 13:
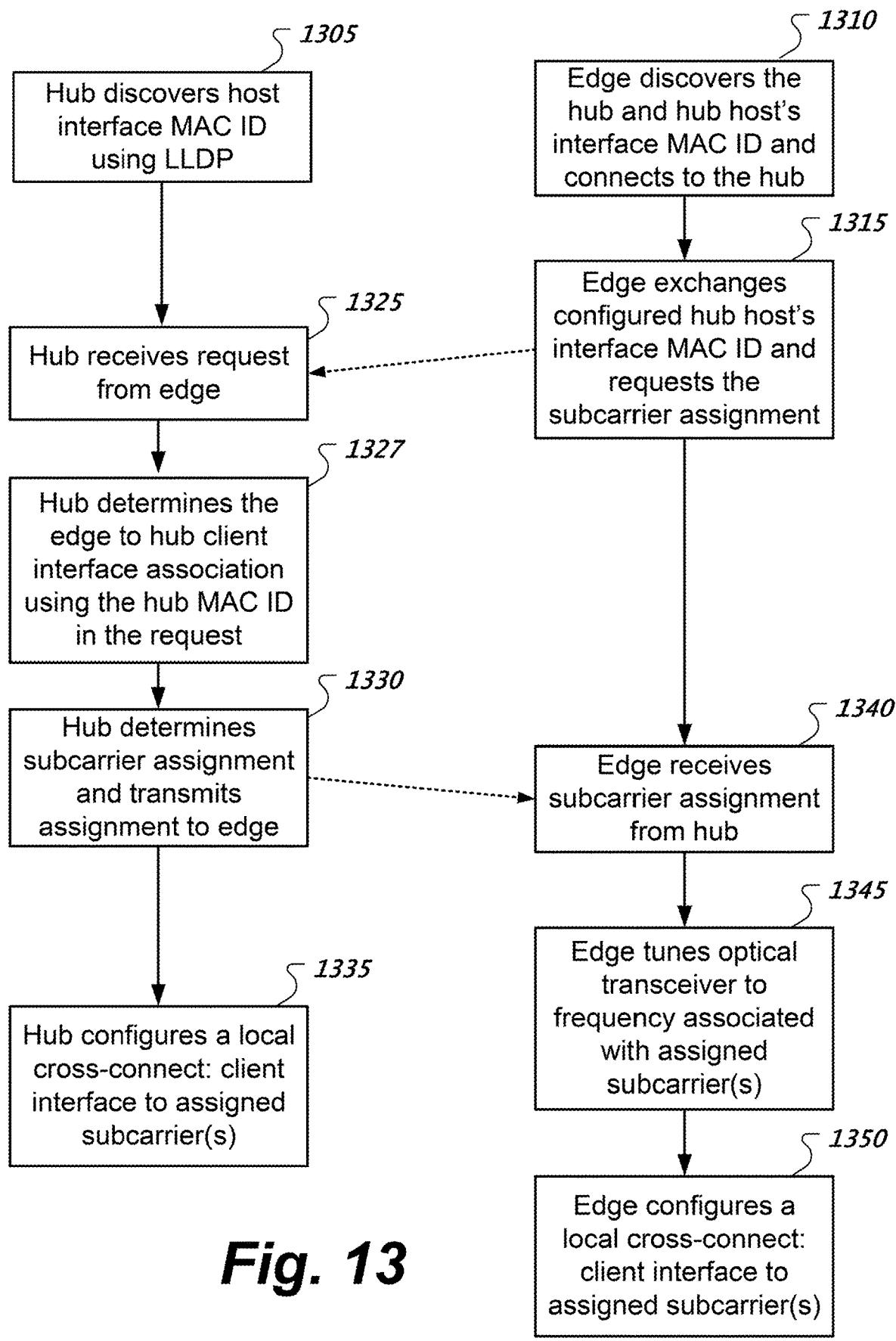
FIG. 13 is a flowchart of an example of discovery and configuration processes that includes discovery of a hub hosts' interface medium access control identifier.

FIG. 13 is a flowchart of an example of discovery and configuration processes that includes discovery of a hub host's interface medium access control identifier. These processes can be performed by hub and edge optical modules. At 1305, the hub optical module discovers a host interface MAC ID using LLDP. At 1310, the edge optical module discovers the hub optical module and the hub host's interface MAC ID and connects to the hub optical module. At 1315, the edge optical module exchanges the configured hub host's interface MAC ID and requests the subcarrier assignment.

At 1325, the hub optical module receives the request from the edge optical module. At 1327, the hub optical module determines the edge optical module to hub client interface association using the hub host's interface MAC ID in the request. At 1330, the hub optical module determines a subcarrier assignment and transmits the assignment to the edge optical module. At 1335, the hub optical module configures a local cross-connect between its client interface and the assigned subcarrier(s).

At 1340, the edge optical module receives the subcarrier assignment from the hub optical module. At 1345, the edge optical module tunes its optical transceiver to the carrier frequency associated with assigned subcarrier(s). In some implementations, the carrier frequency used by the edge optical module is the center frequency of a channel (e.g., $f_c$ of FIG. 6A). In some implementations, the carrier frequency used by the edge optical module is a center frequency of a subcarrier group within a channel. For example, if subcarrier group SCG1 of FIG. 6A is assigned to the edge optical module, the carrier frequency can be set to a center frequency of the subcarrier group SCG1, which is a frequency between subcarriers SC1 and SC2. At 1350, the edge optical module configures a local cross-connect between the client interface and the assigned subcarrier(s).

Various aspects of the described systems and techniques can be implemented, for example, in electronic circuitry, computer hardware, firmware, software, or in combinations of them, such as the structural means disclosed in this specification and structural equivalents thereof. In some implementations, this can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., a field programmable gate array (FPGA) or an application specific integrated circuit (ASIC). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows also can be performed by, and apparatus also can be implemented as, special purpose logic circuitry, e.g., FPGA or an ASIC.

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments. Accordingly, other implementations also are within the scope of the claims.

What is claimed is:

1. An apparatus comprising:
an optical transceiver configured to communicate with a plurality of edge optical modules of respective edge devices via an optical communication network, the edge optical modules respectively comprising edge interfaces; and
a controller coupled with the optical transceiver and configured to:
provide, to a hub device, a plurality of hub interfaces, the hub interfaces being configurable to respectively correspond to different optical subcarriers transmitted from and received by the optical transceiver,
advertise, to the hub device, an application select code to enable the hub device to configure an operational mode and to selectively enable each of the hub interfaces in the operational mode,
store one or more associations among the hub interfaces and the edge interfaces, and
configure one or more cross-connections among the hub interfaces and the optical subcarriers based on the one or more associations.

2. The apparatus of claim 1, wherein the one or more associations include a hub-edge interface association, and wherein the controller is configured to:
receive, via the optical transceiver, a request from an edge optical module of the plurality of edge optical modules,
determine the hub-edge interface association based on the request,
assign an optical subcarrier of the optical subcarriers to the edge optical module based on the hub-edge interface association, and
transmit assignment information identifying the assigned optical subcarrier to the edge optical module.

3. The apparatus of claim 2, wherein the controller is configured to determine a carrier frequency associated with the request, wherein the hub-edge interface association is based on the carrier frequency, and wherein the assigned optical subcarrier is within a channel associated with the carrier frequency.

4. The apparatus of claim 3, wherein the controller is configured to:
receive data from the hub device via a hub interface of the hub interfaces that is assigned to handle communications with the edge optical module,
cause the optical transceiver to tune to the channel, and
use the assigned optical subcarrier to transmit the data to the edge optical module.

5. The apparatus of claim 2, wherein the assignment information comprises a channel number and a hub interface identifier, wherein the hub interface identifier is associated with a hub interface of the hub interfaces that is assigned to handle communications with the edge optical module, and wherein the assigned optical subcarrier is selected based on the channel number and the hub interface identifier.

6. The apparatus of claim 2, wherein the request includes a requested host interface medium access control (MAC) address, and wherein the controller is configured to determine the hub-edge interface association based on the requested host interface MAC address.

7. The apparatus of claim 2, wherein the controller is configured to discover the edge optical modules using an optical control channel, and wherein the request is received over the optical control channel.

8. The apparatus of claim 1, wherein the controller is configured to receive from a configuration server configuration information that provides the one or more associations, wherein the configuration information comprises optical subcarrier assignments for one or more of the edge optical modules.

9. The apparatus of claim 1, comprising:
a memory configured to store optical subcarrier assignments associated with the edge optical modules, wherein the assigned optical subcarrier is in accordance with the optical subcarrier assignments.

10. The apparatus of claim 1, wherein the hub device comprises an optical module that includes the optical transceiver and the controller.

11. An apparatus comprising:
an optical transceiver configured to communicate with a hub optical module of a hub device via an optical communication network; and
a controller coupled with the optical transceiver and configured to:
provide, to an edge device, an edge interface,
advertise, to the edge device, an application select code to enable the edge device to configure an operational mode and to enable the edge interface to transmit and receive data in the operational mode,
store an association among the edge interface and a hub interface of the hub optical module, and
configure a cross-connection among the edge interface and an optical subcarrier based on the association, wherein the optical subcarrier is determined based on the association.

12. The apparatus of claim 11, wherein the controller is configured to:
transmit, via the optical transceiver, a request to the hub optical module to establish communications with the hub optical module, and
receive assignment information from the hub optical module in response to the request, wherein the optical subcarrier is determined based on the assignment information.

13. The apparatus of claim 12, wherein the request is associated with a carrier frequency, wherein the association is based on the carrier frequency, and wherein the optical subcarrier is within a channel associated with the carrier frequency.

14. The apparatus of claim 13, wherein the controller is configured to cause the optical transceiver to tune to a frequency associated with the optical subcarrier.

15. The apparatus of claim 12, wherein the assignment information comprises a channel number and a hub interface identifier associated with the hub interface, and wherein the optical subcarrier is determined based on the channel number and the hub interface identifier.

16. The apparatus of claim 12, wherein the controller is configured to discover the hub optical module using an optical control channel, and wherein the request is transmitted over the optical control channel.

17. The apparatus of claim 12, wherein the request comprises a host interface medium access control (MAC) address, the host interface MAC address being associated with the hub interface.

18. The apparatus of claim 11, wherein the controller is configured to receive configuration information regarding the association from a configuration server.

19. The apparatus of claim 18, wherein the configuration information comprises optical subcarrier assignment information, wherein the optical subcarrier is determined based on the optical subcarrier assignment information.

20. The apparatus of claim 11, wherein the edge device comprises an optical module that includes the optical transceiver and the controller.

* * * * *